US007237222B1

(12) United States Patent
Nedbal et al.

(10) Patent No.: US 7,237,222 B1
(45) **Date of Patent: *Jun. 26, 2007**

(54) PROTOCOL FOR CONTROLLING AN EXECUTION PROCESS ON A DESTINATION COMPUTER FROM A SOURCE COMPUTER

(75) Inventors: Manuel Nedbal, Haag (AT); Paul Fellner, Marchtrenk (AT); Andreas Schlemmer, Leonding (AT)

(73) Assignee: McAfee, Inc., Santa Clara, CA (US)

( * ) Notice: Subject to any disclaimer, the term of this patent is extended or adjusted under 35 U.S.C. 154(b) by 723 days.

This patent is subject to a terminal disclaimer.

(21) Appl. No.: 10/091,415

(22) Filed: Mar. 7, 2002

(51) Int. Cl.
*G06F 9/44* (2006.01)
*G06F 3/00* (2006.01)
*G06F 15/16* (2006.01)

(52) U.S. Cl. ...................... 717/100; 717/120; 717/121; 719/330; 709/230; 709/231; 709/201; 709/202; 709/203; 709/236; 709/237

(58) Field of Classification Search ........ 717/100–178; 709/217, 201–203, 230–246; 719/203, 330; 718/102–108
See application file for complete search history.

(56) References Cited

U.S. PATENT DOCUMENTS

| | | | | |
|---|---|---|---|---|
| 6,209,124 | B1 | 3/2001 | Vermeire et al. | 717/1 |
| 6,336,137 | B1 | 1/2002 | Lee et al. | 709/219 |
| 6,404,445 | B1 | 6/2002 | Galea et al. | 345/853 |
| 6,449,624 | B1* | 9/2002 | Hammack et al. | 707/203 |
| 6,745,208 | B2 | 6/2004 | Berg et al. | 707/201 |
| 6,807,636 | B2 | 10/2004 | Hartman et al. | 713/201 |
| 6,931,546 | B1* | 8/2005 | Kouznetsov et al. | 717/174 |
| 7,107,574 | B1 | 9/2006 | Nedbal | 717/120 |
| 2001/0034771 | A1* | 10/2001 | Hutsch et al. | 709/217 |
| 2002/0100017 | A1 | 7/2002 | Grier et al. | 717/120 |
| 2002/0100036 | A1 | 7/2002 | Moshir et al. | 717/173 |
| 2002/0124061 | A1 | 9/2002 | Mossman | 709/220 |
| 2002/0129129 | A1 | 9/2002 | Bloch et al. | 709/220 |
| 2002/0129345 | A1* | 9/2002 | Tilden et al. | 717/162 |
| 2003/0074392 | A1 | 4/2003 | Campbell et al. | 709/203 |
| 2003/0105838 | A1 | 6/2003 | Presley | 709/220 |
| 2003/0172127 | A1 | 9/2003 | Northrup et al. | 709/219 |
| 2004/0205772 | A1* | 10/2004 | Uszok et al. | 719/317 |
| 2006/0190575 | A1* | 8/2006 | Harvey et al. | 709/222 |

OTHER PUBLICATIONS

U.S. Appl. No. 10/092,424 which was filed on Mar. 7, 2002.
U.S. Pat. Appl. No. 10/092,420 which was filed on Mar. 7, 2002.

(Continued)

*Primary Examiner*—Meng-Al T. An
*Assistant Examiner*—Insun Kang
(74) *Attorney, Agent, or Firm*—Zilka-Kotab, PC; Christopher J. Hamaty

(57) ABSTRACT

A data protocol permitting a source computer to initiate execution of an execution process on a destination computer uses XML data in which different complex data types correspond to different execution processes to be triggered. Parameter data to be used by the associated execution processes may be embedded within the corresponding complex data types.

47 Claims, 25 Drawing Sheets

OTHER PUBLICATIONS

Office Action Summary from U.S. Appl. No. 10/092,424 which was mailed on Jul. 01, 2005.

Office Action Summary from U.S. Appl. No. 10/092,424 which was mailed on Dec. 17, 2004.

Office Action Summary from U.S. Appl. No. 10/092,420 which was mailed on May 16, 2005.

Buhler, Dieter et al., "Remote Fieldbus System Management with Java XML" ISIE 2000, Cholula, Puebla, Mexico.

"Soap Version 1.2 Part I: Messaging Framework" W3C Recommendation Jun. 24, 2003.

"XML-RPC Home Page" http:www.xmlrpc.com.

Office Action Summary from U.S. Appl. No. 10/092,424 which was mailed on Dec. 23, 2005.

Office Action Summary from U.S. Appl. No. 10/092,420 which was mailed on Dec. 23, 2005.

Advisory Action from U.S. Appl. No. 10/092,420 which was mailed on Apr. 10, 2006.

Advisory Action from U.S. Appl. No. 10/092,424 which was mailed on Mar. 13, 2006.

* cited by examiner

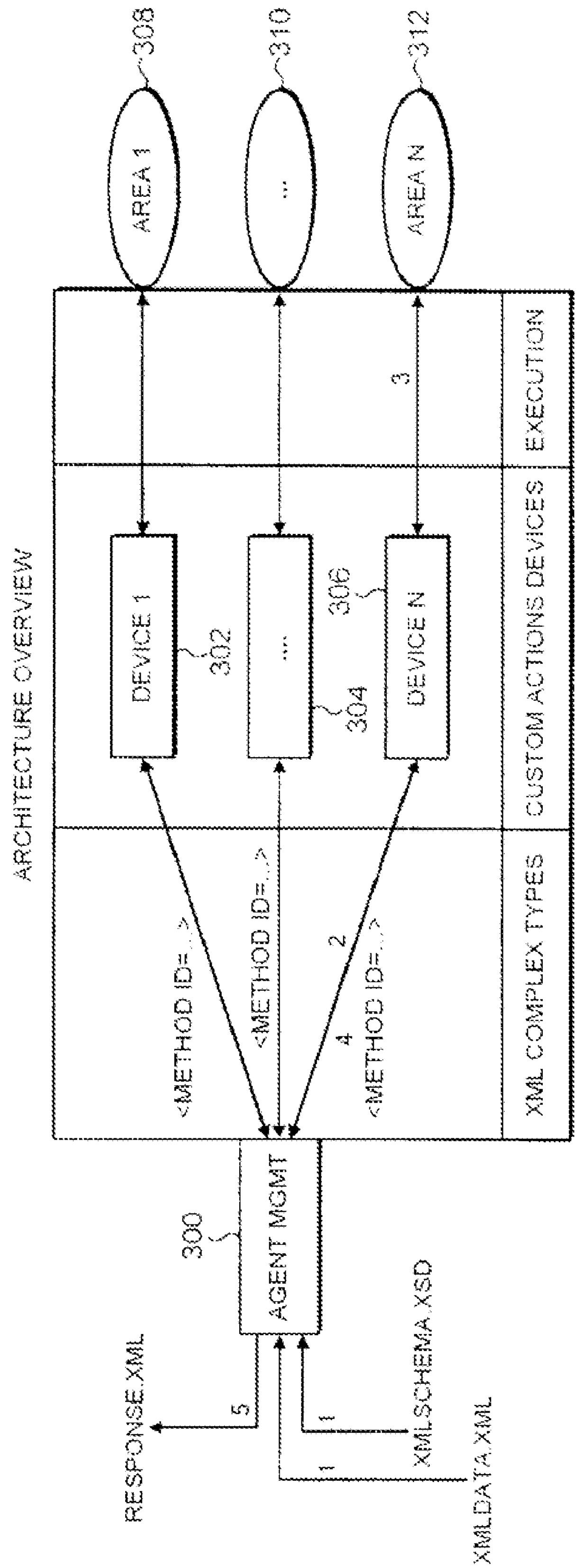

1) REQUEST XML FILE IS PASSED TO AGENT MGMT CONTAINING COMPLEX TYPES AGENT MGMT SPLITS THE DATA INTO PARTS AND HANDS THE <METHOD> OVER TO THE CORRESPONDING CUSTOM ACTION DEVICES
2) THE COMPLEX TYPE <METHOD> DESCRIBES THE METHOD TO EXECUTE AND ITS PARAMETERS
3) CUSTOM ACTIONS DEVICES EXECUTE THE FUNCTIONS IN A CERTAIN AREA THEY ARE RESPONSIBLE FOR AND PACK THE RESULT INTO XML COMPLEX TYPES
4) COMPLEX TYPES CONTAINING RESULT DATA ARE RETURNED TO AGENT MGMT
5) XML STREAM HAS BEEN PACKED AND IS RETURNED

FIG. 1

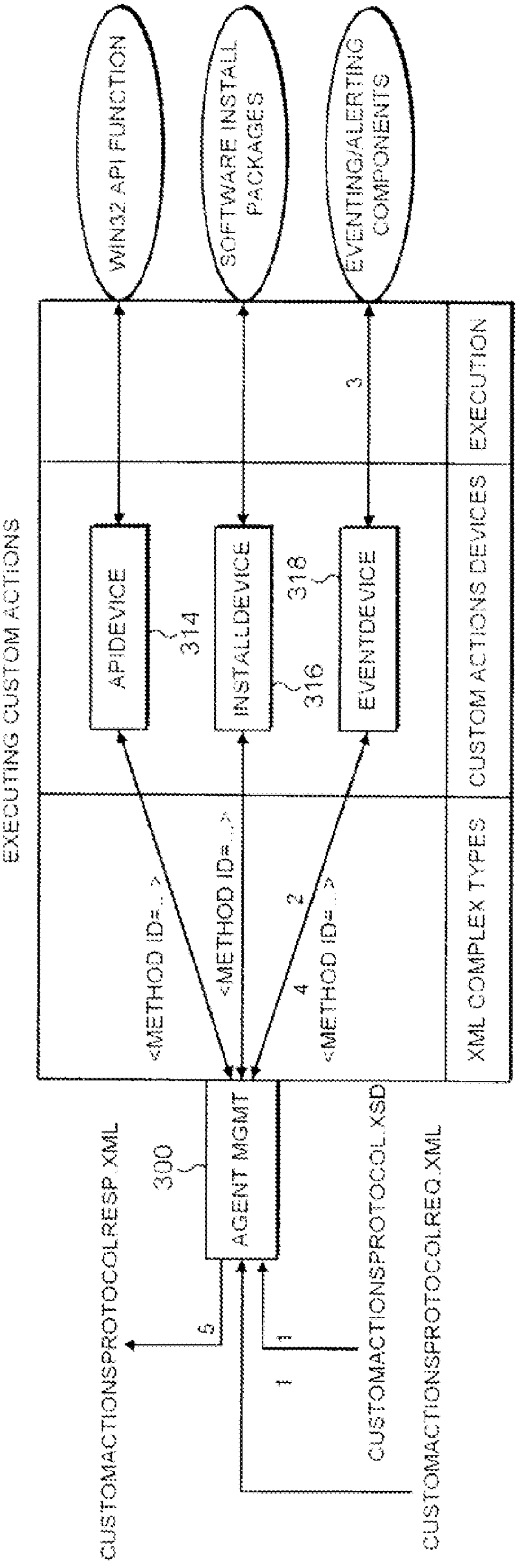

1) REQUEST XML FILE IS PASSED TO AGENT MGMT CONTAINING COMPLEX TYPES
2) THE COMPLEX TYPE <METHOD> DESCRIBES THE METHOD TO EXECUTE AND ITS PARAMETERS
EACH <METHOD> IS PASSED TO THE CORRESPONDING CUSTOM ACTIONS DEVICE
3) CUSTOM ACTIONS DEVICES EXECUTE THE FUNCTIONS AND PACK THE RESULT INTO XML COMPLEX TYPES
4) COMPLEX TYPES CONTAINING RESULT DATA ARE RETURNED TO AGENT MGMT
5) XML STREAM HAS BEEN PACKED AND IS RETURNED

FIG. 2

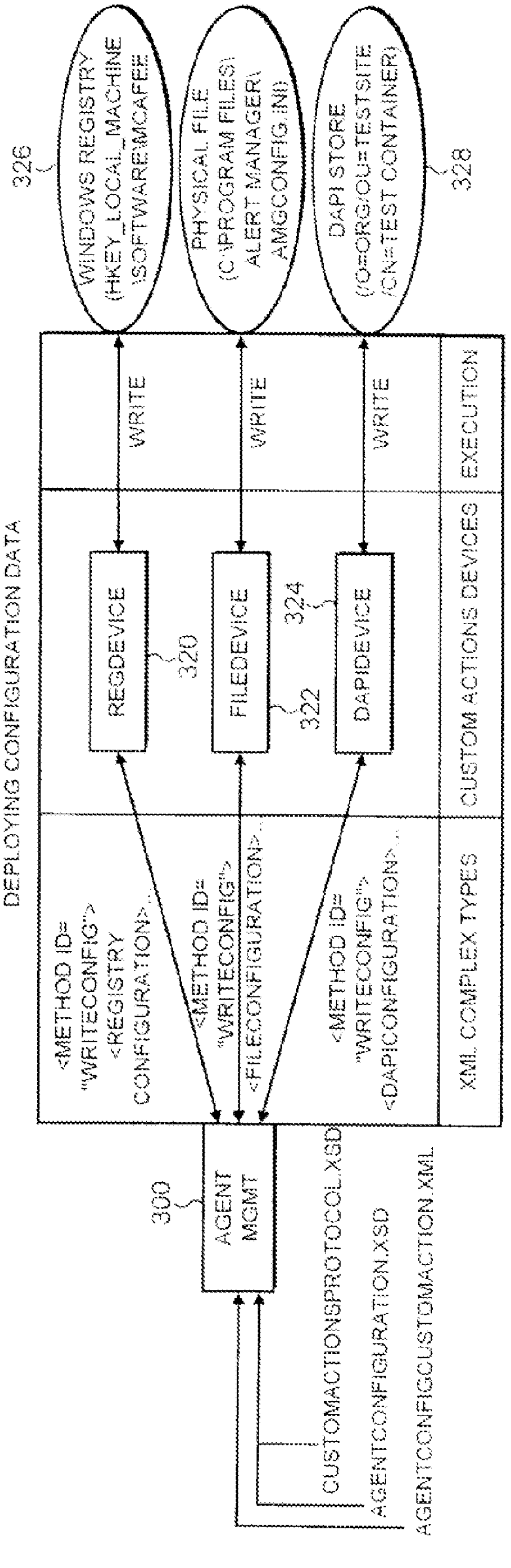

1) AGENT MGMT RECEIVES AGENTCONFIGCUSTOMACTION.XML
2) XML FILE IS VALIDATED AGAINST .XSD FILE(S) TO MAKE SURE VALID DATA IS WRITTEN
3) XML COMPLEX TYPES ARE SENT TO CUSTOM ACTIONS DEVICES, THE PARAMETERS CONTAINING THE CONFIGURATION DATA
4) CUSTOM ACTIONS DEVICES UPDATE THE CONFIG STORE THEY ARE RESPONSIBLE FOR
5) OPTIONALLY A RETURN VALUE CAN BE RETURNED AS A RESPONSE.XML FILE

FIG. 3

1) REQUEST XML FILE IS PASSED TO AGENT MGMT CONTAINING EMPTY REQUESTED COMPLEX TYPES
2) THE EMPTY COMPLEX TYPES ARE PASSED TO THE CUSTOM ACTIONS DEVICE
3) COMPLEX TYPES ARE FILLED BY MAPPING REQUIRES DATA FROM STORE
4) COMPLEX TYPES CONTAINING DATA ARE RETURNED TO AGENT MGMT
5) XML STREAM HAS BEEN PACKED AND IS RETURNED

| PROTOCOL SPECIFICATION | | |
|---|---|---|
| <CONTROLDATA> | | CONTAINS AGENT SPECIFIC CONTROL DATA LIKE VERSION INFORMATION, THE COMMAND TO EXECUTE AND COMPUTER INFORMATION SENDING THE CUSTOM ACTIONS INFORMATION |
| | <COMMAND> | THE COMMAND FIELD COULD BE USED TO EASILY DETERMINE IF DATA IS GOING TO BE RETRIEVED (REQUESTCUSTOMACTION) OR RETURNED AFTER THE ACTION HAS BEEN EXECUTED (RESPONDTOCUSTOMACTION) - OPTIONAL |
| | <SERVER> | COMPUTER INFORMATION OF THE SENDER. IF THE AGENT IS ABLE TO PROCESS REQUESTS IN PARALLEL AND ASYNCHRONOSLY, THIS INFORMATION IS USEFUL. THE SIMPLEST FORM OF THIS FIELD CONTAINS THE COMPUTER NAME |
| <CUSTOMACTIONS> | | ANY NUMBER OF CUSTOM ACTION COM SERVERS OR DLLS OR EXECUTEABLES REQUIRED FOR THE TASKS ARE LISTED WITHIN THE CUSTOMACTIONS |
| | ID | THE ID SPECIFIES A CLSID IF THE CUSTOM ACTION METHOD IS CONTAINED IN A COM SERVER OR THE PATH TO A DLL/EXE FILE IF A LIBRARY OR AN EXECUTEABLE IMPLEMENTS THE METHOD TO EXECUTE. IF A CLSID IS SPECIFIED, THE FOLLOWING <INTERFACE> COMPLEX TYPE IS REQUIRED TO SPECIFY THE INTERFACE OF THE COM SERVER CONTAINING THE METHOD TO EXECUTE. OTHERWISE <INTERFACE> IS NOT REQUIRED AND ANY NUMBER OF <METHOD> TYPES FOLLOW IMMEDIATELY |
| | <INTERFACE> | ONLY REQUIRED IF THE <METHOD> IS IMPLEMENTED IN A COM SERVER |
| | ID | THE INTERFACE IDENTIFIER OF THE COM SERVER (IID) |
| | <METHOD> | ANY NUMBER OF METHODS IMPLEMENTED IN THE CUSTOM ACTION DEVICE |
| | ID | THE METHOD NAME. IN CASE OF A COM SERVER, THIS IS THE METHOD NAME OF THE COM INTERFACE. ELSE THIS DENOTES THE NAME OF AN EXPORTED FUNCTION OR E.G. A COMMAND LINE PARAMETER OF AN EXECUTABLE |
| | <PARAMETER> | ANY NUMBER OF PARAMETERS REQUIRED FOR THE METHOD. THIS INCLUDES REQUESTED OUT PARAMETERS, WHICH ARE LISTED, BUT DON'T CONTAIN DATA AND INOUT PARAMETERS WHICH HAVE A DIFFERENT VALUE ON RESPONSE THAN ON REQUEST |
| | ID | THE NAME OF THE PARAMETER |
| | TYPE | CAN BE ANY STANDARD XML DATATYPE |
| | INOUT | POSSIBLE VALUES ARE 'IN' AND 'INOUT'. SPECIFIES IF THE PARAMETER IS REQUESTED, PASSED TO THE FUNCTION OR PASSED TO THE FUNCTION FOR MODIFICATION |
| | <ANY> | ANY OTHER NON STANDARD XML DATATYPE CAN FOLLOW |

FIG. 8

CUSTOM ACTIONS PROTOCOL XSOL

```
  <?xml version="1.0" ?>
- <AgentProtocol xmlns="http://www.nai.com"
    xmlns:xsi="http://www.w3.org/2001/XMLSchema-instance"
    xsi:schemaLocation="http://www.nai.com CustomActionsProtocol.xsd">
  - <ControlData>
      <Version>0x01000001</Version>
      <MinVersion>0x01000001</MinVersion>
      <Command>RequestCustomAction</Command>
      <Server>ned1wnts2ke</Server>
    </ControlData>
  - <CustomActions
      id="<AGENT_INSTALLED_DIR>\\CustomActionsLibrary\\CustAct1.dll">
    - <Method id="GetRegStringValue">
        <Parameter id="Key" type="xs:string"
          inout="in"><AGENT_INSTALLED_REGKEY></Parameter>
        <Parameter id="Valuename" type="xs:string"
          inout="in">AgentVersion</Parameter>
        <Parameter id="Result" type="xs:string" inout="out" />
      </Method>
    </CustomActions>
  - <CustomActions id="{06E0062A-5069-4793-ACED-F80BE1BBC4AF}">
    - <Interface id="{C9E1CC03-8007-412A-8F5D-532C57DF4482}">
      - <Method id="ExecuteSilentInstallation">
          <Parameter id="ProductName" type="xs:string"
            inout="in">TestInstallProduct</Parameter>
          <Parameter id="ProductVersion" type="xs:decimal"
            inout="in">0x01000001</Parameter>
          <Parameter id="Location" type="xs:string"
            inout="in">c:\InstallImages</Parameter>
          <Parameter id="Result" type="xs:string" inout="out" />
        </Method>
      </Interface>
    - <Interface id="{C9E1CC03-8007-412A-8F5D-532C57DF4482}">
      - <Method id="GetSystemDirectory">
          <Parameter id="Directory" type="xs:string" inout="out" />
          <Parameter id="Result" type="xs:decimal" inout="out" />
        </Method>
      </Interface>
    </CustomActions>
  - <CustomActions id="{06E0062B-5069-4793-ACED-F80BE1BBC4AF}">
    - <Interface id="{A000CC03-8007-412A-8F5D-532C57DF4482}">
      - <Method id="TriggerEvent">
          <Parameter id="EventID" type="xs:decimal"
            inout="in">1000</Parameter>
          <Parameter id="EventDescription" type="xs:decimal"
            inout="in">The event %EventID% has been triggered by %
            USERNAME% on computer %COMPUTERNAME%. The %
            FILENAME% file is infected with %VIRUSNAME%. This has
            been detected by engineversion %ENGINEVERSION%
            datversion %DATVERSION%.</Parameter>
          <Parameter id="COMPUTERNAME" type="xs:string"
            inout="in">sourcecomputer</Parameter>
          <Parameter id="USERNAME" type="xs:string"
            inout="in">sourceuser</Parameter>
          <Parameter id="FILENAME" type="xs:string"
            inout="in">kernel32.dll</Parameter>
          <Parameter id="VIRUSNAME" type="xs:string"
```

CUSTOM ACTIONS PROTOCOL RESP XML

FIG. 10A

```
        inout="in">Nimbda</Parameter>
          <Parameter id="ENGINEVERSION" type="xs:decimal"
            inout="in">0x04005001</Parameter>
          <Parameter id="DATVERSION" type="xs:decimal"
            inout="in">0x07003009</Parameter>
          <Parameter id="Result" type="xs:string" inout="out" />
        </Method>
      </Interface>
    </CustomActions>
</AgentProtocol>
```

CUSTOM ACTIONS PROTOCOL REQ XML

FIG. 10B

```
<?xml version="1.0" ?>
- <AgentProtocol xmlns="http://www.nai.com"
    xmlns:xsi="http://www.w3.org/2001/XMLSchema-instance"
    xsi:schemaLocation="http://www.nai.com CustomActionsProtocol.xsd">
  - <ControlData>
      <Version>0x01000001</Version>
      <MinVersion>0x01000001</MinVersion>
      <Command>RspondToCustomAction</Command>
      <Server>ned1wnts2ke</Server>
    </ControlData>
  - <CustomActions
      id="<AGENT_INSTALLED_DIR>\\CustomActionsLibrary\\CustAct1.dll">
    - <Method id="GetRegStringValue">
        <Parameter id="Result" type="xs:string"
          inout="out">5.0.1.10</Parameter>
      </Method>
    </CustomActions>
  - <CustomActions id="{06E0062A-5069-4793-ACED-F80BE1BBC4AF}">
    - <Interface id="{C9E1CC03-8007-412A-8F5D-532C57DF4482}">
      - <Method id="ExecuteSilentInstallation">
          <Parameter id="Result" type="xs:string" inout="out">Error: Invalid
            Image path specified.</Parameter>
        </Method>
      </Interface>
    - <Interface id="{C9E1CC03-8007-412A-8F5D-532C57DF4482}">
      - <Method id="GetSystemDirectory">
          <Parameter id="Directory" type="xs:string"
            inout="out">C:\Winnt\System32</Parameter>
          <Parameter id="Result" type="xs:decimal"
            inout="out">0</Parameter>
        </Method>
      </Interface>
    </CustomActions>
  - <CustomActions id="{06E0062B-5069-4793-ACED-F80BE1BBC4AF}">
    - <Interface id="{A000CC03-8007-412A-8F5D-532C57DF4482}">
      - <Method id="TriggerEvent">
          <Parameter id="Result" type="xs:string" inout="out">Event sent to
            testcomputer2</Parameter>
        </Method>
      </Interface>
    </CustomActions>
</AgentProtocol>
```

CUSTOM ACTIONS PROTOCOL RESP XML

FIG. 11

AGENT CONFIGURATION XSOL - REGISTRY CONFIGURATION

AGENT CONFIGURATION XSOL - FILE CONFIGURATION

AGENT CONFIGURATION XSOL - DAPI CONFIGURATION

```
<?xml version="1.0" ?>
- <AgentProtocol xmlns="http://www.nai.com"
   xmlns:xsi="http://www.w3.org/2001/XMLSchema-instance"
   xsi:schemaLocation="http://www.nai.com CustomActionsProtocol.xsd
   http://www.nai.com AgentConfiguration.xsd">
 - <ControlData>
    <Version>0x01000001</Version>
    <MinVersion>0x01000001</MinVersion>
    <Command>RequestCustomAction</Command>
    <Server>ned1wnts2ke</Server>
   </ControlData>
 - <CustomActions id="RegistryMapping.dll">
  - <Method id="WriteConfig">
   - <RegistryConfiguration
       id="HKEY_LOCAL_MACHINE\SOFTWARE\McAfee">
    - <Product id="Alert Manager">
       <Version>0x04070000</Version>
       <DisplayName>Alert Manager 4.7</DisplayName>
     - <Language id="0407">
        <Version>0x01000002</Version>
      - <Event id="1">
         <LONGDESCRIPT>Das ist eine Test-Nachricht von Alert
           Manager.</LONGDESCRIPT>
         <SHORTDESCRIPT>Testing</SHORTDESCRIPT>
         <Severity>5</Severity>
         <Enabled>1</Enabled>
        </Event>
       </Language>
     - <Language id="0409">
        <Version>0x01000002</Version>
      - <Event id="1">
         <LONGDESCRIPT>This is an alert manager test
           messge.</LONGDESCRIPT>
         <SHORTDESCRIPT>Testing</SHORTDESCRIPT>
         <Severity>0</Severity>
         <Enabled>1</Enabled>
        </Event>
      - <Event id="2">
         <LONGDESCRIPT>Text of event 2.</LONGDESCRIPT>
         <SHORTDESCRIPT>Testing</SHORTDESCRIPT>
         <Severity>1</Severity>
        </Event>
       </Language>
      </Product>
     </RegistryConfiguration>
    </Method>
  - <Method id="ReadConfig">
     <RegistryConfiguration
       id="HKEY_LOCAL_MACHINE\SOFTWARE\McAfee\*" />
    </Method>
   </CustomActions>
- <CustomActions id="INIFileMapping.dll">
  - <Method id="WriteConfig">
   - <FileConfiguration id="C:\Program Files\Alert
       Manager\AMGConfig.ini">
    - <Extensions>
```

AGENT CONFIG CUSTOM ACTION XML

FIG. 15A

```
        <amg>AMGConfig</amg>
        <asf>MPEGVideo</asf>
        <wmp>MPEGVideo2</wmp>
       </Extensions>
      </FileConfiguration>
     </Method>
   - <Method id="ReadConfig">
      <FileConfiguration id="C:\Program Files\Alert
        Manager\AMGConfig.ini" />
     </Method>
   </CustomActions>
 - <CustomActions id="MAPIMapping.dll">
   - <Method id="WriteConfig">
     - <DAPIConfiguration id="/O=org/OU=TestSite/CN=TestContainer"
         <BinaryProperty>0123456789ABCDEF00000</BinaryProperty>
       </DAPIConfiguration>
     </Method>
   - <Method id="ReadConfig">
       <DAPIConfiguration id="/O=org/OU=TestSite/CN=TestContainer"
     </Method>
   </CustomActions>
</AgentProtocol>
```

AGENT CONFIG CUSTOM ACTION XML

FIG. 15B

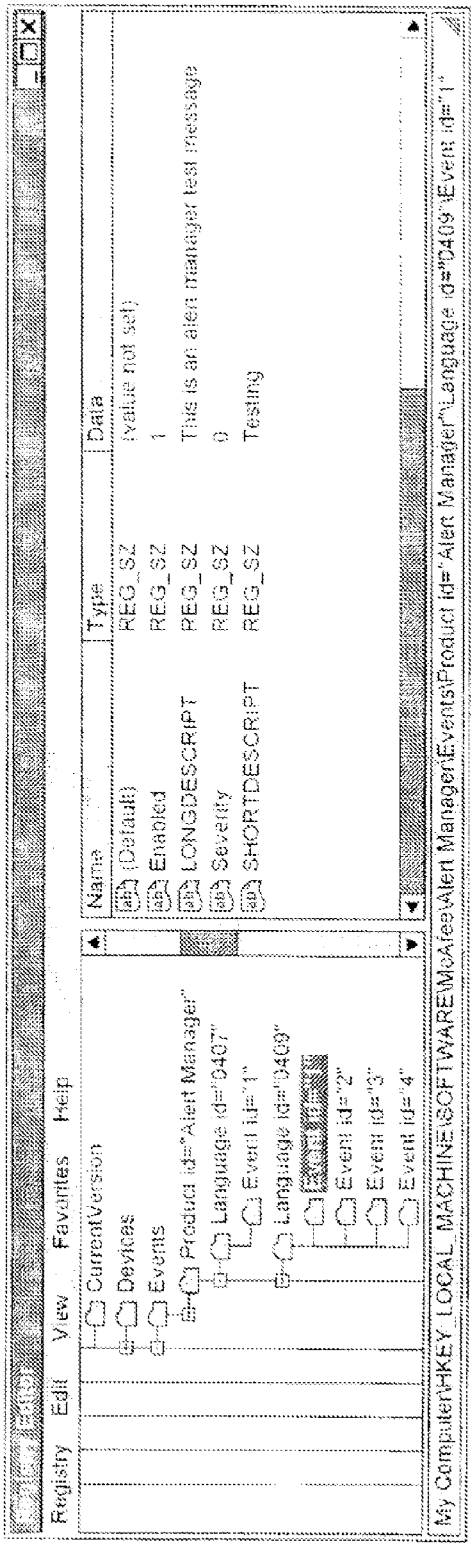
REGISTRY DATA FIG. 18
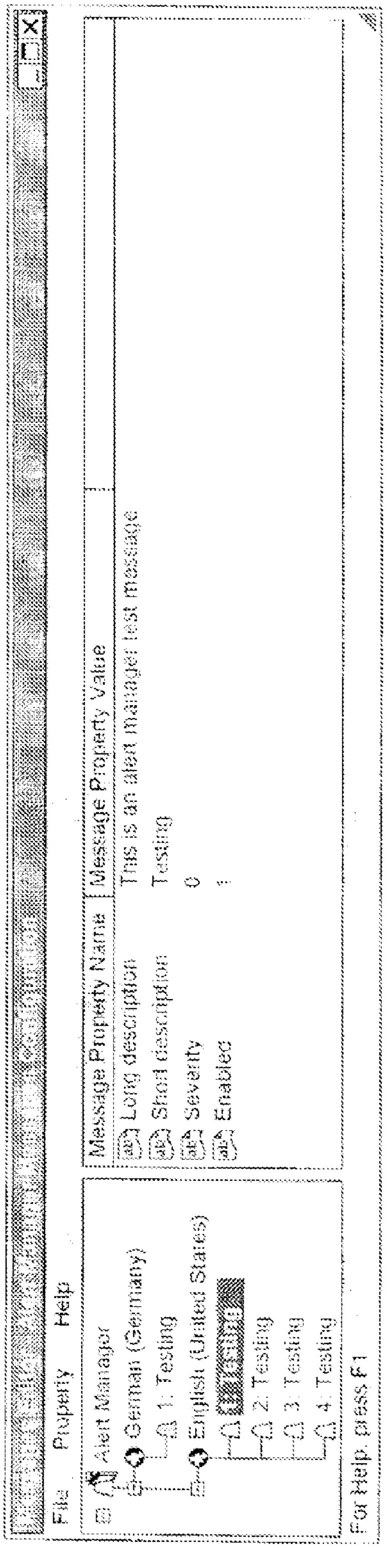
DOM DATA VIEW FIG. 19

```
  <?xml version="1.0" ?>
- <AMGEvents xmlns="http://www.nai.com"
    xmlns:xsi="http://www.w3.org/2001/XMLSchema-instance"
    xsi:schemaLocation="http://www.nai.com AMGEvents.xsd">
  - <Product id="Alert Manager">
      <Version>0x04070000</Version>
      <DisplayName>Alert Manager 4.7</DisplayName>
    - <Language id="0407">
        <Version>0x01000002</Version>
      - <Event id="1">
          <LONGDESCRIPT>Das ist eine Test-Nachricht von Alert
            Manager.</LONGDESCRIPT>
          <SHORTDESCRIPT>Testing</SHORTDESCRIPT>
          <Severity>5</Severity>
          <Enabled>1</Enabled>
        </Event>
      </Language>
    - <Language id="0409">
        <Version>0x01000002</Version>
      - <Event id="1">
          <LONGDESCRIPT>This is an alert manager test
            messge.</LONGDESCRIPT>
          <SHORTDESCRIPT>Testing</SHORTDESCRIPT>
          <Severity>0</Severity>
          <Enabled>1</Enabled>
        </Event>
      - <Event id="2">
          <LONGDESCRIPT>Text of event 2.</LONGDESCRIPT>
          <SHORTDESCRIPT>Testing</SHORTDESCRIPT>
          <Severity>1</Severity>
        </Event>
      - <Event id="3">
          <LONGDESCRIPT>Text of event 3.</LONGDESCRIPT>
          <SHORTDESCRIPT>Testing</SHORTDESCRIPT>
          <Severity>1</Severity>
        </Event>
      - <Event id="4">
          <LONGDESCRIPT>Text of event 4.</LONGDESCRIPT>
          <SHORTDESCRIPT>Testing</SHORTDESCRIPT>
          <Severity>1</Severity>
        </Event>
      </Language>
    </Product>
  </AMGEvents>
```

XML DATA

FIG. 20

```
<?xml version="1.0" encoding="UTF-8" ?>
<!-- edited with XML Spy v4.0.1 U (http://www.xmlspy.com) by Napalm
(Napalm) -->
- <xs:schema targetNamespace="http://www.nai.com"
    xmlns="http://www.nai.com"
    xmlns:xs="http://www.w3.org/2001/XMLSchema"
    elementFormDefault="qualified">
    <xs:element name="DisplayName" type="xs:string" />
    <xs:element name="Enabled" type="xs:boolean" />
  - <xs:complexType name="EventType">
    - <xs:all>
        <xs:element ref="LONGDESCRIPT" />
        <xs:element ref="SHORTDESCRIPT" />
        <xs:element ref="Severity" />
        <xs:element ref="Enabled" minOccurs="0" />
      </xs:all>
      <xs:attribute name="id" type="xs:string" use="required" />
    </xs:complexType>
  - <xs:complexType name="LanguageType">
    - <xs:sequence>
        <xs:element ref="Version" />
        <xs:element name="Event" type="EventType"
          maxOccurs="unbounded" />
      </xs:sequence>
      <xs:attribute name="id" type="xs:string" use="required" />
    </xs:complexType>
  - <xs:element name="Product">
    - <xs:complexType>
      - <xs:sequence>
          <xs:element ref="Version" />
          <xs:element ref="DisplayName" />
          <xs:element name="Language" type="LanguageType"
            maxOccurs="unbounded" />
        </xs:sequence>
        <xs:attribute name="id" type="xs:string" use="required" />
      </xs:complexType>
    </xs:element>
  - <xs:element name="AMGEvents">
    - <xs:complexType>
      - <xs:sequence>
          <xs:element ref="Product" maxOccurs="unbounded" />
        </xs:sequence>
      </xs:complexType>
    </xs:element>
    <xs:element name="LONGDESCRIPT" type="xs:string" />
    <xs:element name="SHORTDESCRIPT" type="xs:string" />
    <xs:element name="Severity" type="xs:string" />
    <xs:element name="Version" type="xs:string" />
  </xs:schema>
```

XSD DATA

FIG. 22

PROTOCOL FOR CONTROLLING AN EXECUTION PROCESS ON A DESTINATION COMPUTER FROM A SOURCE COMPUTER

BACKGROUND OF THE INVENTION

1. Field of the Invention

This invention relates to the field of data processing systems. More particularly, this invention relates to a data transmission protocol to enable control of an execution process on a destination computer from a source computer.

2. Description of the Prior Art

It is known to provide various data transmission protocols that allow remote procedure calls and responses. One example of such a known protocol is SOAP (Simple Object Access Protocol) that is based on XML and defines a protocol for the exchange of information in the form of XML. This includes the provision of remote procedure calls and responses via the SOAP RPC protocol. A significant disadvantage of SOAP is that it is closely related to http. This in turn leads to the requirement for an http server equipped with a SOAP capability on each computer involved in a SOAP remote procedure call. This is a significant cost, complexity, and performance overhead.

Another known protocol for initiating remote procedure calls is that XML-RPC protocol. A disadvantage of this protocol is that the software architecture at the destination computer combines the process that receives the transmitted data together with the execution processes that are to be triggered in an inflexible manner that is not readily extensible and may not be easily user customised.

SUMMARY OF THE INVENTION

Viewed from one aspect the present invention provides a computer program product for triggering an operation at a destination computer using data transferred between a source computer and said destination computer, said computer program product comprising:

receiving code operable to receive at said destination computer operation specifying XML data sent by said source computer;

parsing code operable to parse said operation specifying XML data to identify one or more complex data types within said operation specifying XML data;

matching code operable to match the or each complex data type with an associated execution process available to said destination computer; and triggering code operable to trigger processing by the or each execution process associated with a complex data type within said operation specifying XML data.

The invention recognises and provides a low overhead and yet flexible protocol by using XML data in which different complex data types are used to correspond to different execution processes to be triggered. In this way, resources, such as an XML parser that are often already provided on the destination computer, may be re-used without incurring additional overhead. Furthermore, providing a mapping between complex data types and execution processes allows a readily extensible way of managing different execution processes.

In preferred embodiments parameter data for the execution process is represented by data within the complex data type for that execution process. This provides a flexible and yet robust mechanism for transferring such parameter data.

The execution process that is triggered by the data transferred via the protocol may take a variety of different forms, but these preferably include making an API call at the destination computer, triggering events at the destination computer and/or configuring the destination computer to execute a particular computer program (e.g. installation of a new computer program, updating of an existing computer program to a new version or updating the configuration of an existing version of a computer program).

In the context of installing/configuring software remotely, the execution process(es) conveniently provide a mechanism for mapping desired configuration data to the configuration data stores of a particular destination computer, such as within the Windows Registry, an INI file, a DAPI store and/or a database.

It will be appreciated that the identifier of an execution process may take a wide variety of different forms. However, particularly simple and direct forms are ones in which the identifier specifies a computer file, such as a DLL, that is operable to trigger the desired execution process, a communication channel operable to trigger the desired execution process or an operating system command operable to trigger the desired execution process.

The data transmission protocol of the present technique may advantageously also be used to return result data from an execution process to the initiating computer. The result data returned could take a wide variety of different forms, such as indicating whether or not the desired execution process was available on the destination computer or returning configuration data read from the various configuration data stores mentioned above in order to permit the initiating computer to more effectively remotely manage the destination computer configuration.

The security and robustness of the above techniques are improved when the destination computer additionally includes validation whereby operation specifying data is validated against a template defining valid data.

As well as providing mechanism at the destination computer for responding to the transmission protocol described above, another aspect of the present invention also provides a computer program product for triggering an operation at a destination computer using data transferred between a source computer and said destination computer, said computer program product comprising:

data forming code operable to form at said source computer operation specifying XML data containing one or more complex data types;

transmitting code operable to transmit from said source computer to said destination computer said operation specifying XML data; wherein the or each complex data type within said operation specifying XML data corresponds to an execution process available to said destination computer to be triggered to operate.

This aspect of the invention relates to a source computer for initiating a data transmission in accordance with the above described protocol.

Other aspects of the invention also provide a method of triggering an operation at a destination computer using data transferred between a source computer and a destination computer, an apparatus for triggering an operation at a destination computer using data transferred between the source computer and destination computer and their respective source computer counterparts. The protocol itself may also be considered as another aspect of the invention.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 schematically illustrates the software architecture at a target computer for processing autonomously and remotely initiated target processes;

FIG. 2 schematically illustrates the software architecture at a target computer supporting different types of target process;

FIG. 3 schematically illustrates the software architecture at a target computer for deploying software configuration data;

FIG. 8 is a diagram representing a protocol specification of a data transmission protocol that may be used to trigger execution processes at a remote computer;

FIGS. 10A and 10B are an example of XML data that may form a request to execute an execution process at a destination computer;

FIG. 11 is an example of XML data that may be returned as a response from an execution process such as that initiated in connection with the XML data of FIGS. 10A and 10B;

FIGS. 15A and 15B show an example of XML data that may be used to transmit a configuration update to a destination computer using a selection of different execution processes upon the destination computer to perform the different parts of the configuration update;

FIG. 18 schematically represents Windows Registry data that specifies a computer program configuration;

FIG. 19 illustrates a representation of DOM data as made accessible in memory corresponding to the configuration data of FIG. 18;

FIG. 20 is an XML data representation of the configuration data of FIG. 18;

FIG. 22 is a second representation of an XSD schema corresponding to the XML data of FIG. 20;

DESCRIPTION OF THE PREFERRED EMBODIMENTS

Figure 4:
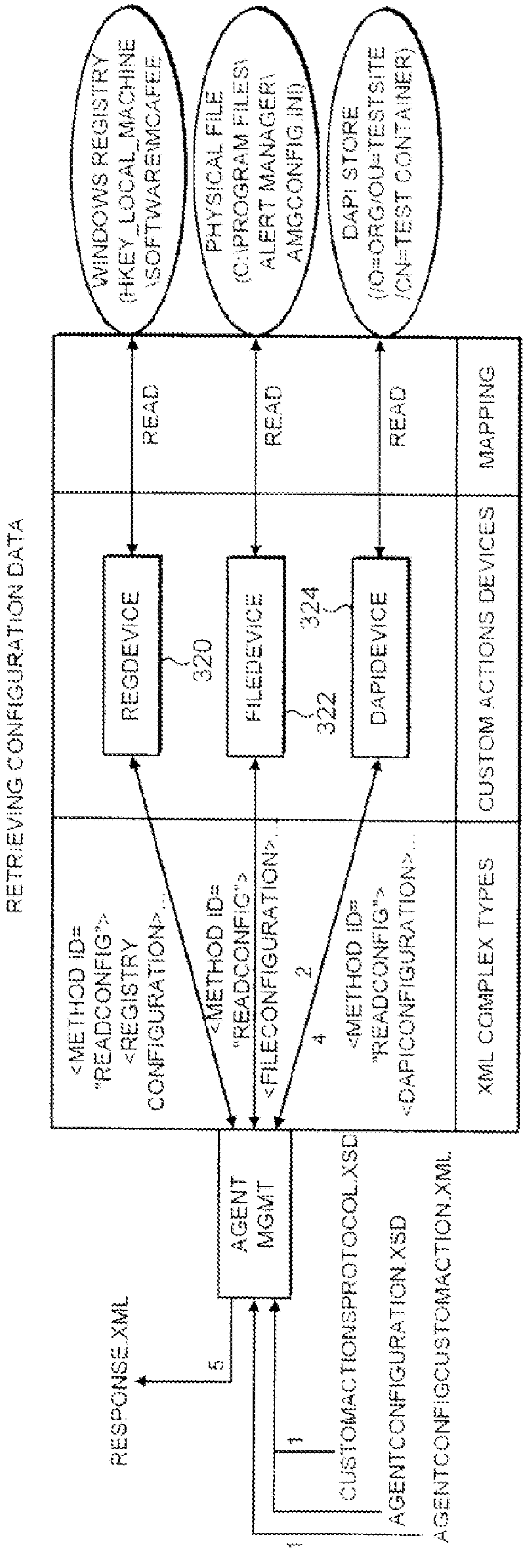
FIG. 4 schematically illustrates the software architecture at a target computer for retrieving configuration data.

FIG. 1 schematically illustrates a software architecture which may be used within a target computer operating in accordance with one example of the herein described techniques. An agent process 300 receives operation specifying data in the form of XML data and optionally validating XML schema data. The XML schema data (XSD) may be applied to the received XML data to check that it meets the required form before it is used. The agent process then parses the XML data using an XML parser. The XML parser may already be provided within the target computer for use with other applications and processes that deal with XML data. Alternatively, if required, a specific XML parser could be provided solely for the use of the agent process 300.

When the XML data has been validated and parsed, different complex data types specified within the XML data will be recognised. Each of these complex data types corresponds to a different target process (execution process) on the target computer (destination computer). Accordingly, the different complex data types may be matched with the target processes that are available at the target computer. These different target processes are indicated by the software devices 302, 304 and 306. These target devices can take a wide variety of different forms and should not be considered to be limited to the specific examples discussed herein. Each target device 302, 304 and 306 is responsible for a corresponding area of processing (tasks) 308, 310 and 312. These areas of processing could again take a wide variety of forms and should not be limited to the specific examples discussed herein.

In the example of FIG. 1, the XML data received is parsed and the complex data type corresponding to the software device 306 is identified. This device 306 is then triggered to execute and is passed appropriate parameter data that was also embedded within the corresponding complex data type. The device 306 performs the required processing upon its processing area 312 and generates corresponding result data. The device 306 then packs this result data back into XML data which is returned to the agent process 300 and then in turn to the initiating computer.

It will be appreciated that the target processes/execution processes/devices are substantially independent and separate from the agent process. This enables the ready extension of the number of target processes available. Use of the complex data type to identify the particular target process allows a structured and robust architecture to be formed and yet provides enough flexibility to allow extension, user customisation and a wide variety of parameter data to be utilised.

FIG. 2 is similar to FIG. 1 except more specific examples of target processes are illustrated in the form of an API device 314, an install device 316 and an event device 318. These different devices 314, 316 and 318 correspond to different execution processes which may be remotely triggered using the XML data protocol. More particularly, the API device 314 may be used to trigger a specified Win32 API function call. The install device 316 may be used to make configuration data changes and install associated computer files as part of software installation/updating activity. The event device 318 may be used to trigger processing to perform specific events or monitor the target computer to alert the initiating computer upon the occurrence of particular events. FIG. 2 gives an indication of the flexibility and extensibility of the agent architecture associated with the current technique.

FIG. 3 schematically illustrates a yet more specific example of the architecture on the target computer relating to the deployment of configuration data in association with remote software management. In this example the target processes 320, 322 and 324 respectively relate to software for mapping between parameter data embedded within the corresponding XML complex data types which trigger those processes and the Windows Registry, an INI file and a DAPI store respectively (a mapping to another form of database that holds configuration data is also possible). In this example, the XML data received by the agent process 300 contains three complex data types respectively corresponding to the different target processes 320, 322 and 324. The agent process 300 parses the XML data after validating it with the XSD data which forms the XML schema. The parsing of the XML data extracts the corresponding identifiers of the complex data types which can then be mapped to the available target processes 320, 322 and 324. If a complex data type is encountered which does not have a corresponding available target process on the target computer, then data indicating this may be returned to the initiating computer embedded within the XML protocol of a returned message. In this example, the target process 320 writes to make changes to the Windows Registry 326 as specified by parameter data associated with the complex data type for the device 320. The device 322 makes specified changes or writes a new INI file as directed by its associated parameter data. The device 324 makes changes to an associated DAPI store 328 in accordance with a binary passed as parameter data for the complex data type of the device 324.

FIG. 4 is closely related to FIG. 3. In the example of FIG. 4, the XML data received from the initiating computer corresponds to a request by the initiating computer for each of the devices 320, 322 and 324 to read their corresponding configuration data store and return the contents thereof to the initiating computer as a response embedded within XML data. The software mechanisms within the devices 320, 322 and 324 that map between XML data and configuration data may be substantially reused to provide this data transfer in the opposite direction to that illustrated in FIG. 3. The request for configuration data may be passed to the various devices by way of a requesting XML data transmission in which each of the complex data types corresponding to the different devices is present and identified but with empty parameter data. The corresponding devices 320, 322 and 324 respectively receive their portion of the XML data with its empty parameter data and interpret this as a request to fill that empty parameter data from the data held within the configuration data store to which they control mapping. In this way, detailed configuration data may be returned to the initiating computer.

Figure 5:
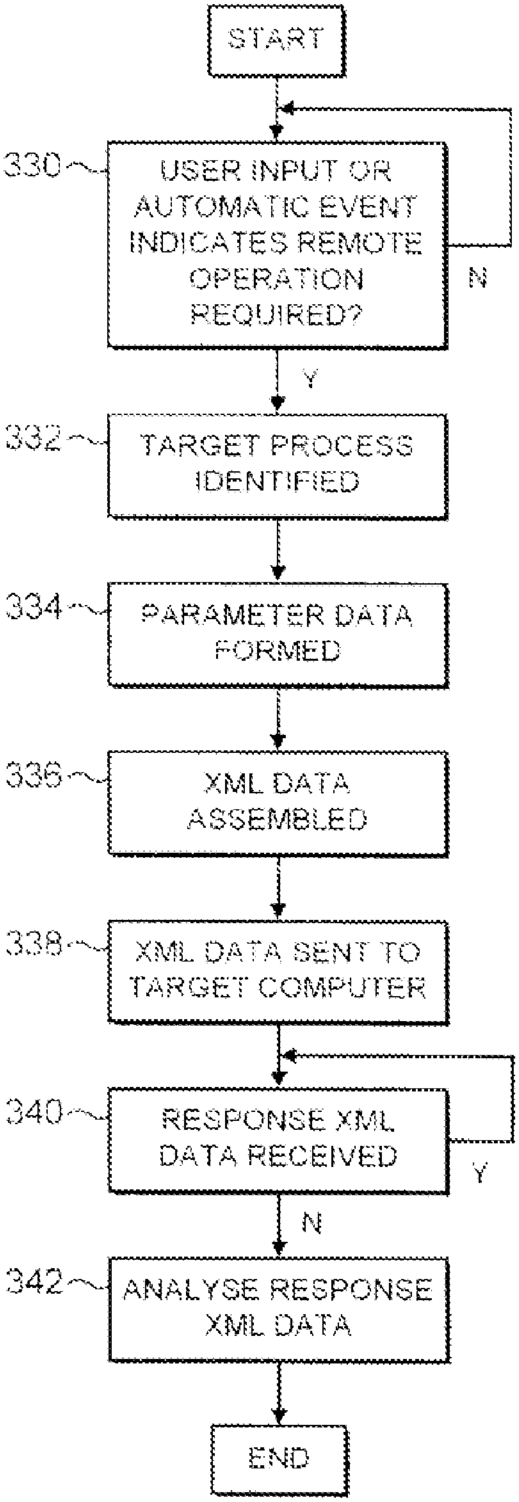
FIG. 5 is a flow diagram schematically illustrating the processing performed by an initiating computer seeking to trigger a target process.

FIG. 5 is a flow diagram schematically illustrating the processing performed by the initiating computer. At step 330 the initiating computer waits for a user input or automatic event that indicates that a remote operation should be triggered. Step 332 identifies the target process which is to be triggered. Step 334 forms the parameter data that is to be associated with the processing to be triggered in the target process. It may be that in some examples no parameter data is required. Alternatively, other target processes may require highly complex and extensive parameter data.

At step 336, the XML data representing the identified target process and parameter data is assembled. Examples of this XML data will be described in more detail later in the specific examples illustrated. In general terms, the XML data has a complex data type corresponding to the target process to be triggered and the parameter data is specified as data within that corresponding complex data type.

At step 338 the XML data is sent to the target computer. At step 340 the initiating computer waits for response XML data to be returned from the target computer. At step 342 received response XML data is analysed. It will be appreciated that steps 340 and 342 are optional and may not be required in many circumstances.

Figure 6:
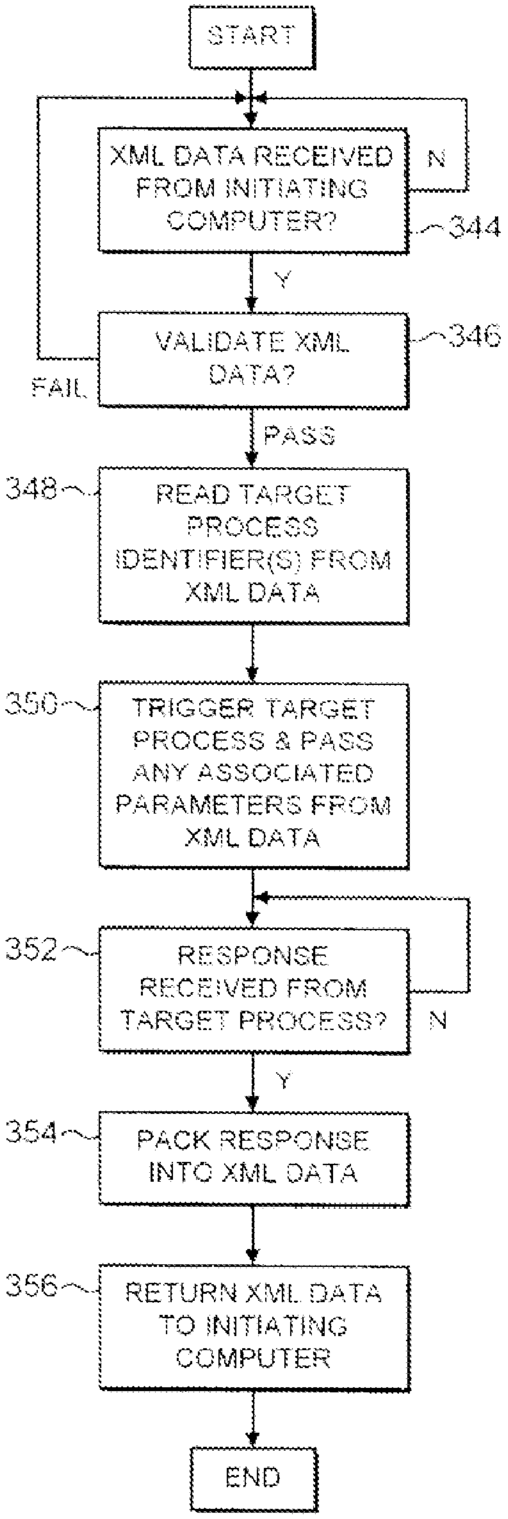
FIG. 6 is a flow diagram schematically illustrating the processing performed by an agent process on the target computer for receiving data for initiating target processes.

FIG. 6 is a flow diagram schematically illustrating the processing performed by the agent process 300. At step 344 the agent process waits for XML data to be received from the initiating computer. At step 346 received XML data is validated against XML schema data. This XML schema data may be sent to the agent process 300 from the initiating computer at the same time as the XML data or alternatively may be already present within the agent process 300. If the XML data does not pass its validation test, then processing returns to step 344. If the XML data is successfully validated, then processing proceeds to step 348 at which the XML data is parsed and the target process identifiers are read as the complex data types within the XML data. These target process identifiers are then matched with the available target processes within the target computer and the one or more appropriate target processes are triggered to operate at step 350. Step 350 also passes to the triggered target processes any associated parameter data within their respective complex data types contained in the received XML data.

At step 352 the agent waits for a response to be received from the target process. At step 354 the response received is packed into XML data to be returned to the initiating computer at step 356. It will be appreciated that steps 354 and 356 are optional.

Figure 7:
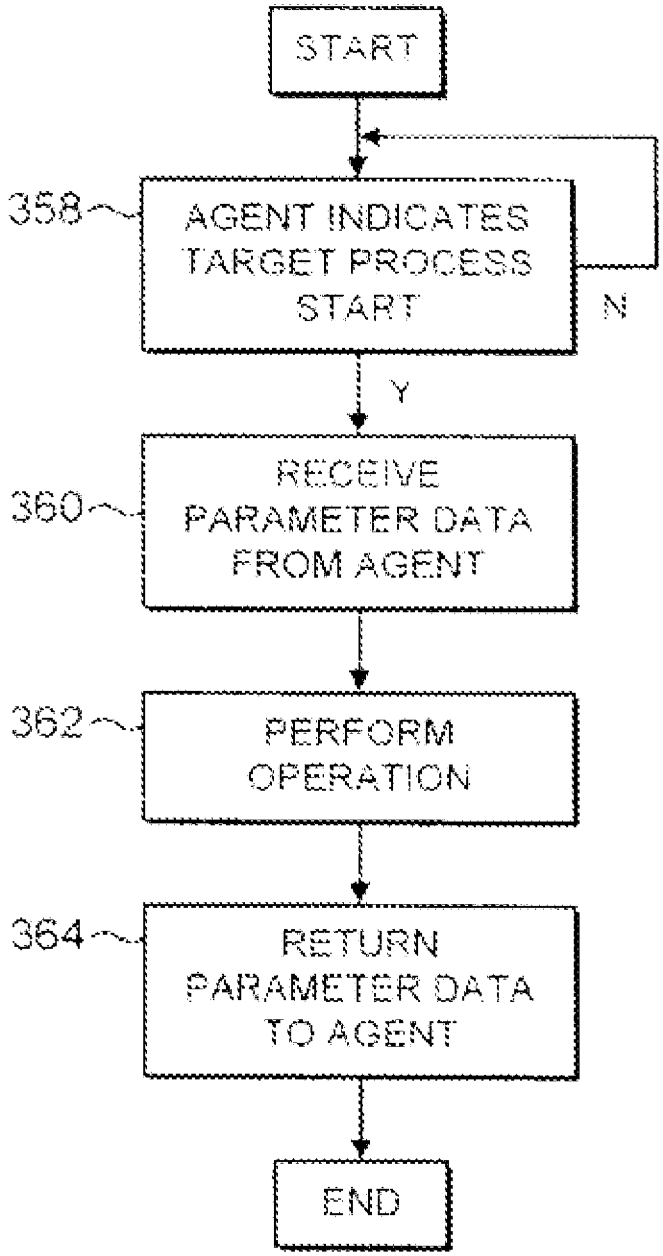
FIG. 7 is a flow diagram schematically illustrating the processing performed by a target process.

FIG. 7 is a flow diagram schematically illustrating the processing that is performed by a target process. At step 358 the target process waits to receive an indication from the managing agent process 300 that it should initiate operation. When operation is initiated, then step 360 operates to receive any parameter data that is being passed to the target process. It may be that in some examples no parameter data is required. At step 362 the target process performs its associated processing operation on the target computer. The processing operation performed may take place on the target computer itself or may take place using a processing source available to the target computer but physically separate therefrom. At step 364 any optional result parameter data is returned to the agent process 300.

FIG. 8 gives example details of an XML protocol which may be used to trigger the execution of an execution process at a destination computer from a source computer. It should be particularly noted within FIG. 8 that in this example the field <CustomActions> corresponds to a complex data type within the XML, data which in turn maps to an execution process to be triggered. Beneath this complex data type resides various optional parameter data associated with the processing being triggered.

Figure 9:
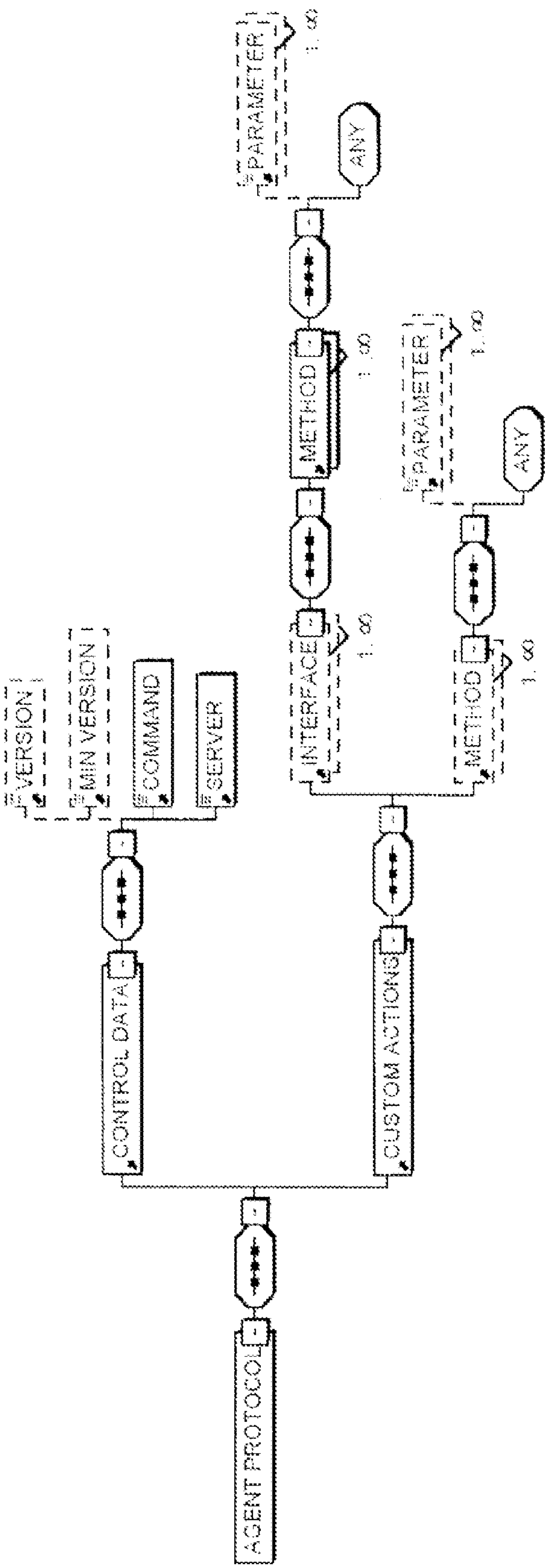
FIG. 9 is an example XML schema for XML data in accordance with the transmission protocol of FIG. 8 that may be used to control execution processes at the destination computer.

FIG. 9 graphically illustrates XML schema data corresponding to the protocol of FIG. 8. This XML schema data may be used by a target computer/destination computer to validate received XML data. It will be seen that the parameter data resides beneath the custom data type within the data structure.

FIGS. 10A and 10B show an example of XML data in accordance with one example of the techniques described herein. It will be seen that this XML data corresponds to the XML schema of FIG. 9 and is an example of input data for FIG. 2. Within this XML data are embedded a plurality of complex data types each corresponding to a CustomAction and having associated parameter data (except the initial ControlData, which may not be necessary and will not be described any further.) The XML data of FIGS. 10A and 10B is a CustomActionRequest specifying processing operations to be performed by the destination computer in accordance with the parameter data specified.

FIG. 11 illustrates example XML data, which can be used as input data for FIG. 2 and corresponds to FIGS. 9, 10A and 10B, but in this case the CustomAction being specified is a Response from the destination computer whereby the destination computer will return parameter data stored at or accessible to the destination computer. This requirement for the parameter data to be returned may be indicated by providing empty parameter fields within the XML data of FIG. 11.

Figure 12:
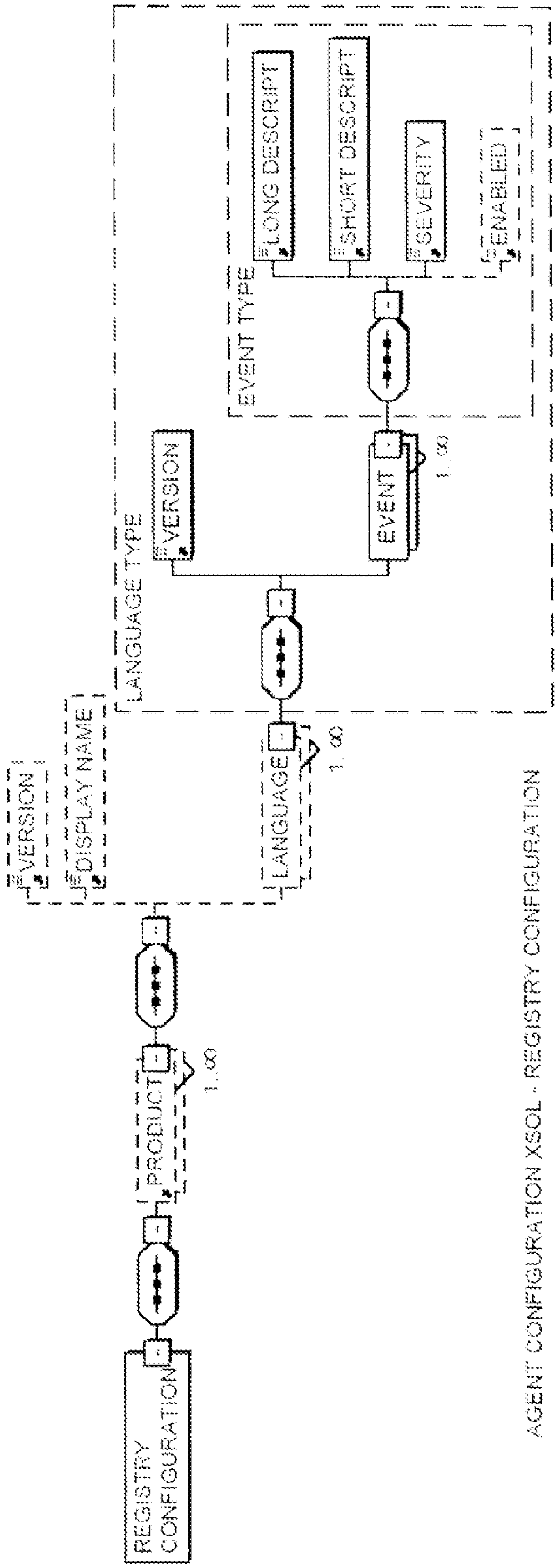
FIG. 12 is an XML schema for XML data that may be used to trigger an execution process for updating Windows Registry data.
Figure 13:
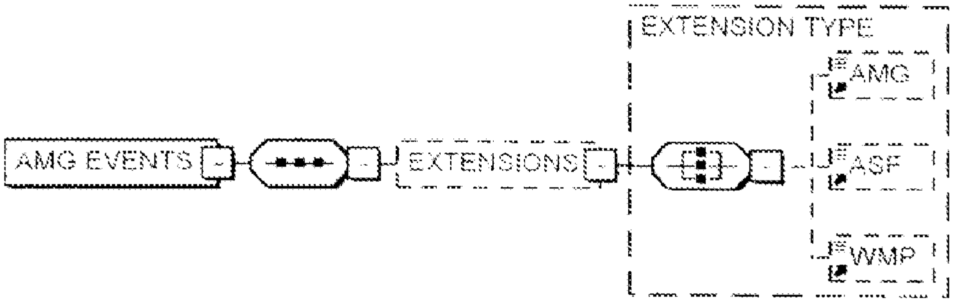
FIG. 13 is an XML schema for XML data that may be used to update configuration data within an INI file.
Figure 14:
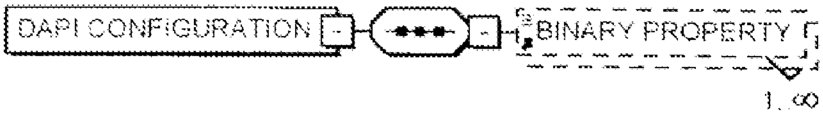
FIG. 14 is an XML schema that may be used to validate XML data for updating configuration data held within a DAPI store.

FIGS. 12, 13 and 14 respectively illustrate XML schemas corresponding to the portions of XML data to be sent to a target computer/destination computer to manage the configuration of that computer broadly in accordance with the arrangement illustrated in FIGS. 3 and 4. The respective XML schemas of FIGS. 12, 13 and 14 apply to the portions of the XML data being different complex data types which will be concatenated together to form the XML data transferred in order respectively to control Windows Registry configuration, INI file configuration and DAPI store configuration.

FIGS. 15A and 15B show an example of XML data for FIGS. 3 and 4 for updating the configuration of a target computer/destination computer in accordance with software installation/management using custom data types corresponding to those of FIGS. 12, 13 and 14. Associated with each of these custom data types is embedded parameter data which will be used by the corresponding target processes/execution processes within the target computer/destination computer.

Figure 16:
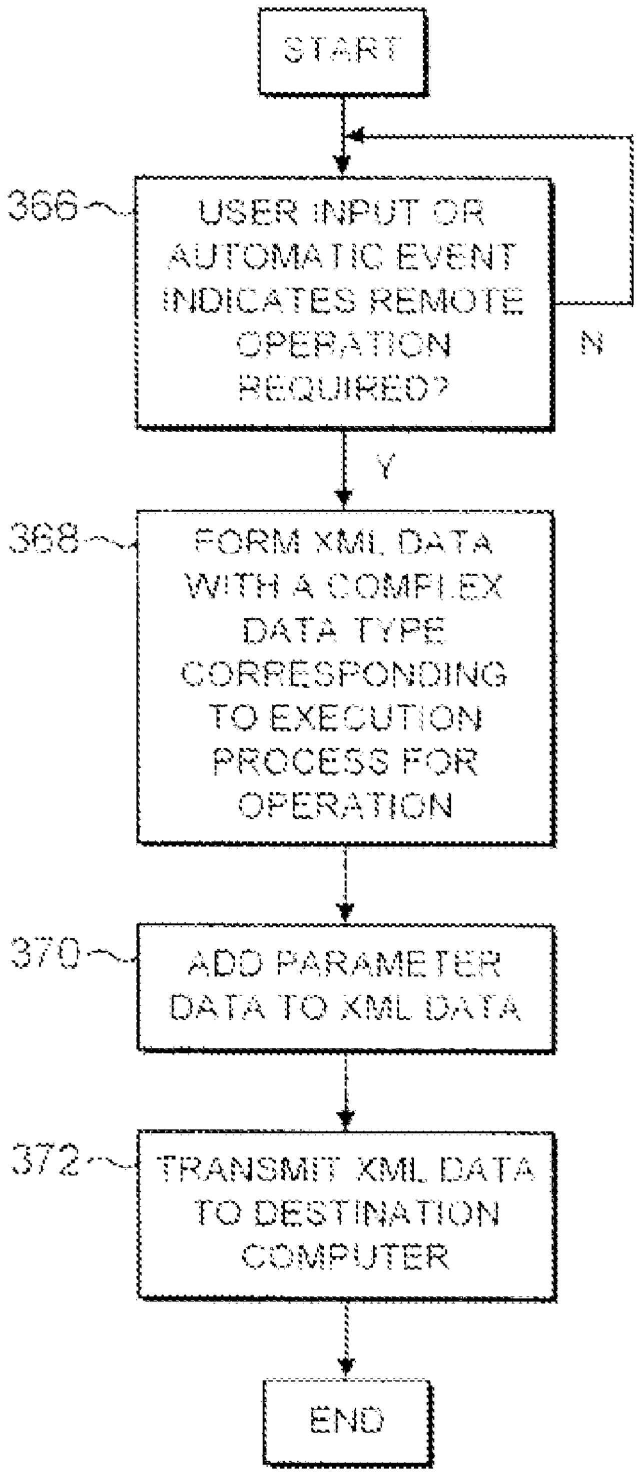
FIG. 16 is a flow diagram schematically illustrating the processing performed at a source computer to assemble an XML data transmission for triggering an execution process at a destination computer.

FIG. 16 is a flow diagram schematically illustrating the processing performed at a source computer in assembling XML data in accordance with the protocol described herein. At step 366 the source computer waits for user input or an automatic event indicating that a remote operation should be triggered. At step 368, the remote operation to be triggered is identified and XML data is assembled including a complex data type corresponding to that remote process to be triggered. It may be that more than one remote process is to be triggered and that respective complex data types may be concatenated within the XML data generated.

At step 370, any required parameter data is added to the XML data to specify the remote processing required by the target process/execute process. At step 372, the XML data that has been generated and assembled is transmitted to the destination computer.

Figure 17:
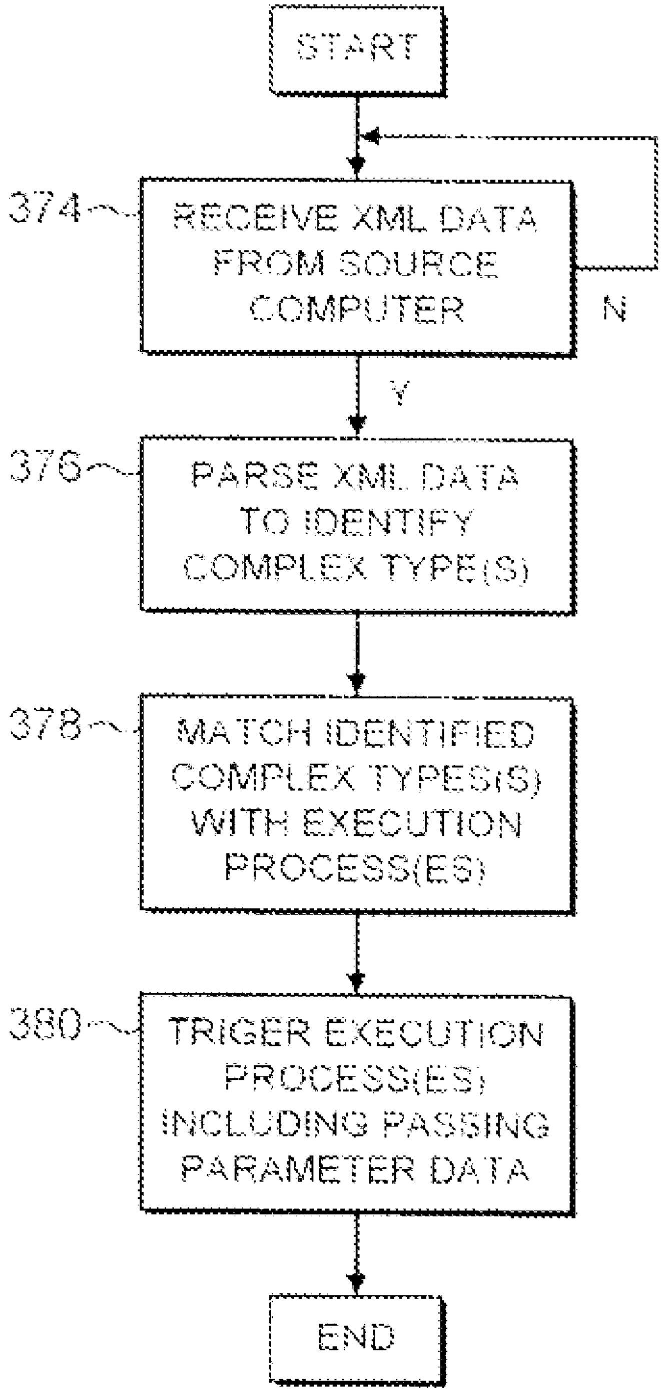
FIG. 17 is a flow diagram schematically illustrating the processing performed at a destination computer in responding to XML data for triggering an execution process at that destination computer.

FIG. 17 is a flow diagram schematically illustrating the processing performed at a destination computer at which execution processes may be remotely triggered. At step 374, the destination computer waits for XML data in accordance with the above described protocol to be received. At step 376, received XML data is parsed to identify the complex data types contained therein. A standard XML parser provided within the destination computer for other purposes may be reused for this parsing, or alternatively a specific XML parser may be provided for the agent process 300. At step 378 the complex data types identified are matched to corresponding execution processes at the destination computer. If a matching execution process is not present, then an appropriate message indicating this may be returned to the source computer by embedding this within returned XML data. At step 380 the execution process indicated by the matched complex data type is triggered including passing any associated parameter data to the execution process concerned.

FIG. 18 schematically represents a portion of the program configuration data associated with an application program that is stored within the Windows Registry of a computer using the Windows operating system provided by Microsoft Corporation. This data is illustrated as being accessed and viewed via the Registry editor tool that is conventionally provided. It will be seen that the configuration data specifies parameters such as the version of the computer program installed, devices associated with that installation, the language to be used in particular circumstances with associated messages for display in response to particular events that may occur during execution and the like. The specification of computer program configuration data within the Windows Registry in this way is well known within the field of computer programming and will not be described herein any further.

FIG. 19 schematically illustrates the configuration data of FIG. 18 which has been mapped into DOM data and is being viewed by an associated viewing tool. The mapping of the configuration data into DOM data can be achieved in a wide variety of different ways. One example, is to map keys within the Windows Registry data to complex data types within the DOM data. Values within the Windows Registry can be mapped to simple types within the DOM data. In order to deal efficiently with keys and values within the Windows Registry that can occur any number of times the mapping mechanism may parse the Windows Registry to identify such keys and types and then associate attributes with the different instances of the keys and types encountered. This helps to provide a more efficient and compact DOM representation of the configuration data which will ultimately result in a more compact and efficient XML representation, with associated XSD validating data.

A table illustrating one example of how Windows Registry configuration data may be mapped in accordance with the present technique is given below.

| Registry Data | XSD Data | XML Data | Comments |
|---|---|---|---|
| Values correspond to XML elements | | | |
| “valuename”= “stringvalue” | <xs:elementname= “valuename” type=“xs:string”/> | <valuename>stringvalue </valuename> | REG_MULTI_SZ strings can be mapped into lists of XML strings and the other way round. |
| “valuename”= dword:dwordvalue | <xs:elementname= “valuename” type=“xs:unsignedLong”/> | <valuename>dwordvalue </valuename> | Conversions between hexadecimal and decimal forms have to be taken into consideration here. |
| “valuename”=hex: hexvalue | <xs:elementname= “valuename” type=“xs:hexBinary”/> | <valuename>hexvalue</ valuename> | |
| Keys correspond to XML complex types | | | |
| [keyname] | <xs:complexTypename= “keyname”><xs:all> . . . All subkeys and values . . . </xs:all></xs:complexType> | <keyname> . . . All subkeys and values . . . </keyname> | <xs:all> means that this type’s sequence of its members does not matter (in contrast to <xs:sequence>) |
| Enumeration of Values, which may occur any number of times | | | |
| ”valuenameid= valueid”= “somevalue name” | <xs:elementname= “valuename” id=“valueid” type=“sometype”> somevalue </xs:element> | <valuename id=“valueid” type=“sometype”> somevalue </valuename> | Changing the format of the registry value name simplifies the XSD validation. The name contains the additional information “valueid”, which distinguishes each value from the others. |
| Enumeration of Keys, which may occur any number of times | | | |
| [keyname id= “keyid”] | <xs:complexTypename= “keyname” id=“keyid”><xs:all> . . . All subkeys and values . . . </xs:all></xs:complexType> | <keyname id=“keyid”> . . . All subkeys and values . . . </keyname> | Similar to the Enumeration of Values, except that any kind and number of subkeys and -values are allowed. |

Known commercially available tools may be used to map from the DOM data as represented in FIG. 19 to corresponding XML data as illustrated in FIG. 20. The highly flexible and robust nature of XML as a representation of data will be appreciated from FIG. 20. Furthermore, a comparison of the Windows Registry data of FIG. 1 stored in its hierarchical structure will be appreciated to map well to the hierarchical data representation that is associated with XML. The recognition and exploitation of the fact that configuration data has a form and structure that is well suited to representation by XML data is an important feature of the current technique and enables many existing tools and resources provided for general XML data manipulation and validation to be reused for the manipulation, management and validation of program configuration data once this is transformed into the form of XML data.

Figure 21:
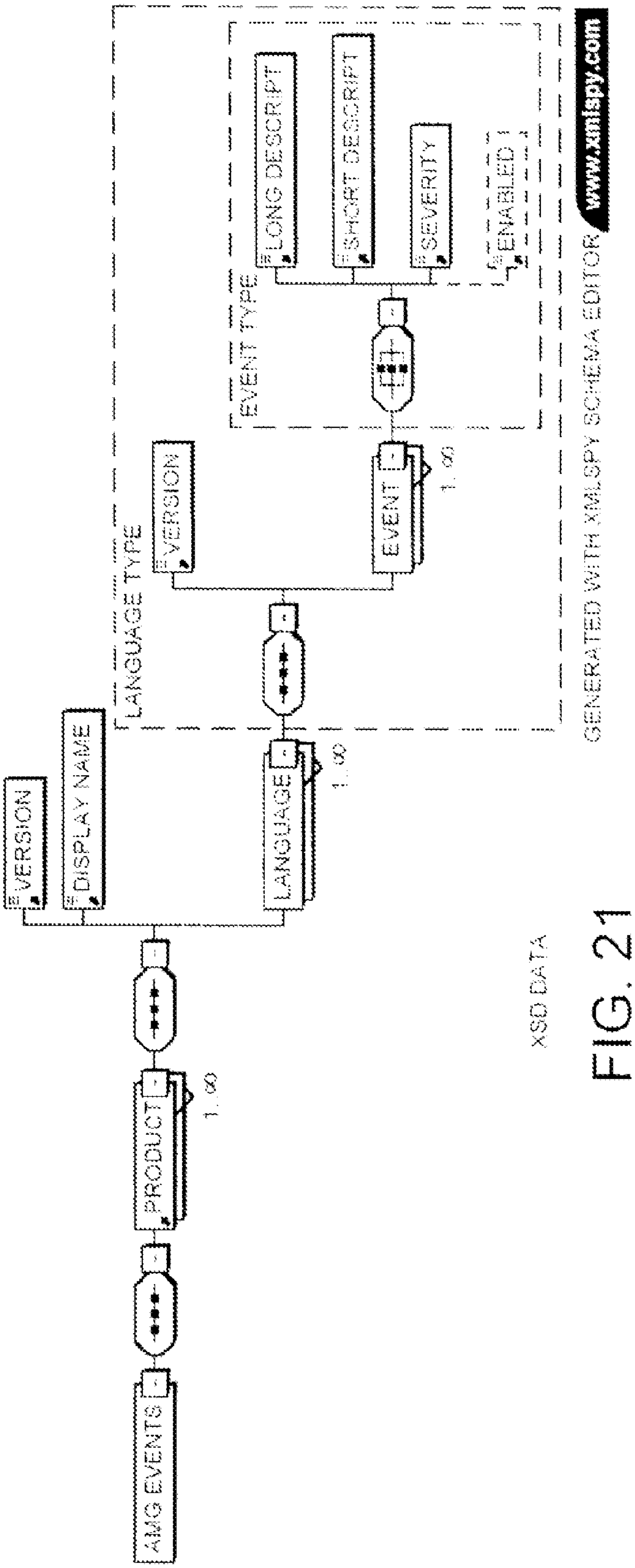
FIG. 21 is a first representation of an XSD schema corresponding to the XML data of FIG. 20.

As well as the tools for mapping configuration data into DOM data and XML data, the validation technique described herein also requires associated validation data in the form of XSD data against which XML data may be checked. This XSD data will normally be generated by the provider of the computer program product which is having its configuration managed in accordance with this technique or it can be generated by programs knowing the configuration data of another program. An efficient way to generate this XSD data is to start with a known valid set of Windows Registry configuration data for the computer program concerned. Once this has been mapped into XML data using the above described mapping technique, a tool such as XMLSpy may be applied to that example XML data representation of the configuration to produce an associated XSD validation template. FIG. 21 illustrates one view of the XSD data that may be generated from the XML data previously discussed using such an automated tool. Such an automated tool typically will not provide the most elegant and compact XSD data corresponding to the XML representation of the configuration data. Accordingly, once the tool has produced the XSD data shown in accordance with FIG. 21, it is proposed that this XSD data would then be examined and hand edited by a programmer familiar with the application concerned. Such hand editing will typically provide a more compact and realistic XSD representation of the configuration data as well as allowing ranges of valid configuration parameters to be specified in a manner generalised from the particular configuration parameters that may be picked up from the example configuration that was converted using the automated tool. This hand editing of XSD data is a general technique used by those familiar with the technical field and will not be described further.

FIG. 22 illustrates an example of XSD data that may be associated with the previously described configuration data and has been generated by hand editing of an automatically provided XSD representation of that XML data.

It will be appreciated that the technique of the present invention is not restricted to the mechanisms for generating associated XSD data as described above nor the particular form of configuration validating data represented by XSD data. However, these techniques are strongly preferred as they do enable the reuse of overhead, resources and skills that are generally already provided.

Figure 23:
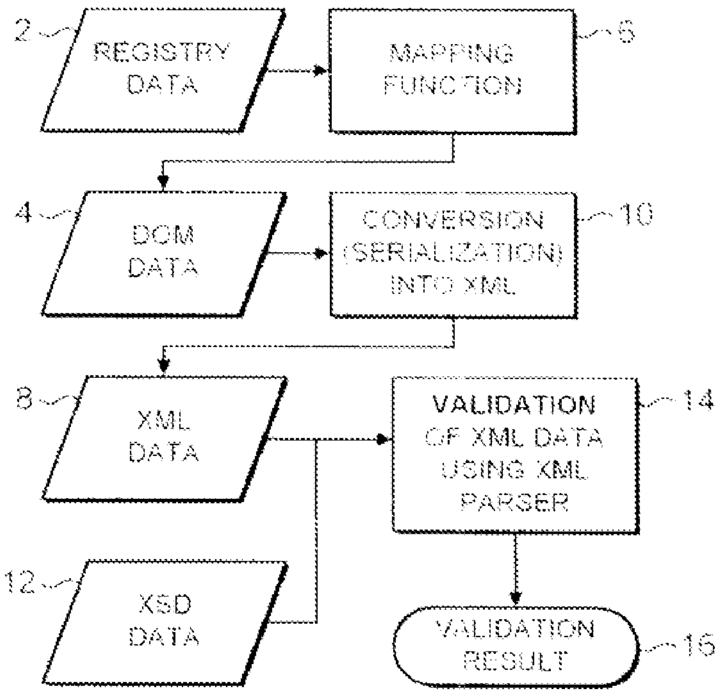
FIG. 23 is a flow diagram schematically illustrating the mapping of configuration data to XML data and then the validation of this XML data.

FIG. 23 is a flow diagram illustrating the validation of program configuration data. Windows Registry data 2 is mapped into DOM data 4 by a mapping function 6. This mapping function may operate using the example mappings described above, or alternative mappings that may be possible. The DOM data 4 is streamed into XML data 8 by step 10. This streaming may also be referred to as serialisation. The XML data 8 together with previously generated and associated XSD data 12 is then provided to an XML parser 14 where the XML data 8 is validated against the XSD data to produce a validation result 16. The XML parsers and validation mechanisms are typically already provided within internet browsers and the like which are installed on computers for reasons other than the validation of configuration data.

Figure 24:
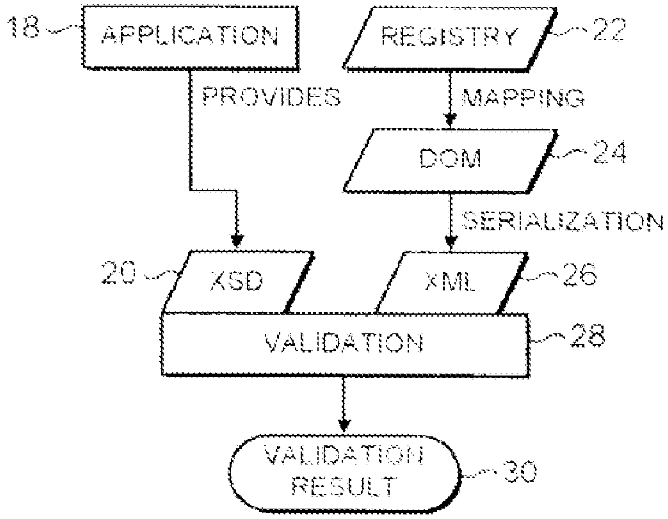
FIG. 24 schematically illustrates an application program checking its own configuration data.

FIG. 24 is a flow diagram illustrating an application program validating its configuration. An application program 18 is provided with an associated set of XSD data 20 by the provider of that application program 18. This XSD data 20 can be viewed as a template for valid configuration data. The provider of the application program 18 will use their knowledge and expertise relating to that application program 18 in order to provide a generic and robust set of XSD data.

The Windows Registry data 22 corresponding to the particular installation concerned is read and mapped into DOM data 24 before being serialised into corresponding XML data 26 which represents the configuration data (Windows Registry data 22). A call may be then made to an XML parser 28 which validates the XML data of the particular installation against the XSD data 20 provided in association with the application program in order to generate a validation result 30. It will be appreciated that the validation result 30 may be used to trigger either an invalid configuration response, such as generation of an appropriate error message, or a valid configuration response, such, for example, as starting execution of the associated application program.

Figure 25:
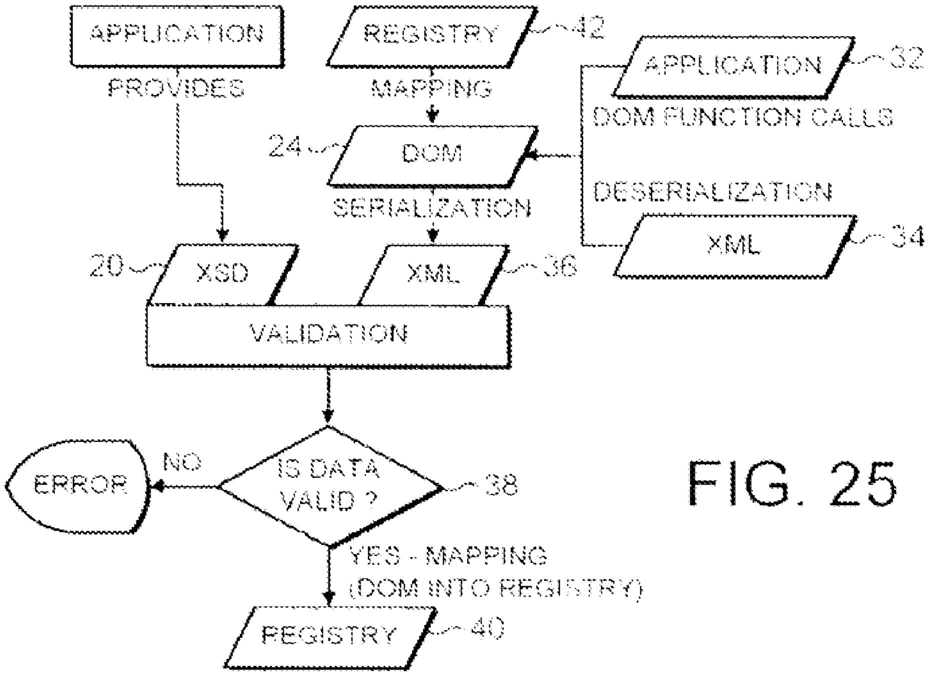
FIG. 25 schematically illustrates the editing of configuration data and its validation by an application program.

FIG. 25 is a flow diagram schematically illustrating the editing of configuration data using the present techniques. It will be seen that a number of the steps in FIG. 25 correspond to those in FIG. 24 and these will not be described again. Compared with FIG. 24, the DOM data 24 is made available to other applications which may modify that DOM data 24 to customise it or edit it in other ways. An editing application 32 may be used to hand edit the DOM data 24. Alternatively and/or additionally, XML data 34 may be de-serialised and appended to or inserted within the DOM data 24 in a manner to extend the configuration data. Once the editing of the DOM data 24 has been completed, this edited DOM data 24 is serialised into XML data 36 which is then validated against the corresponding XSD data 20. If the validation step is passed at step 38, then the modified configuration data represented by the XML data 36 is mapped back into DOM data and then Windows Registry data 40 for use within the computer concerned to replace the original Windows Registry data 42.

Figure 26:
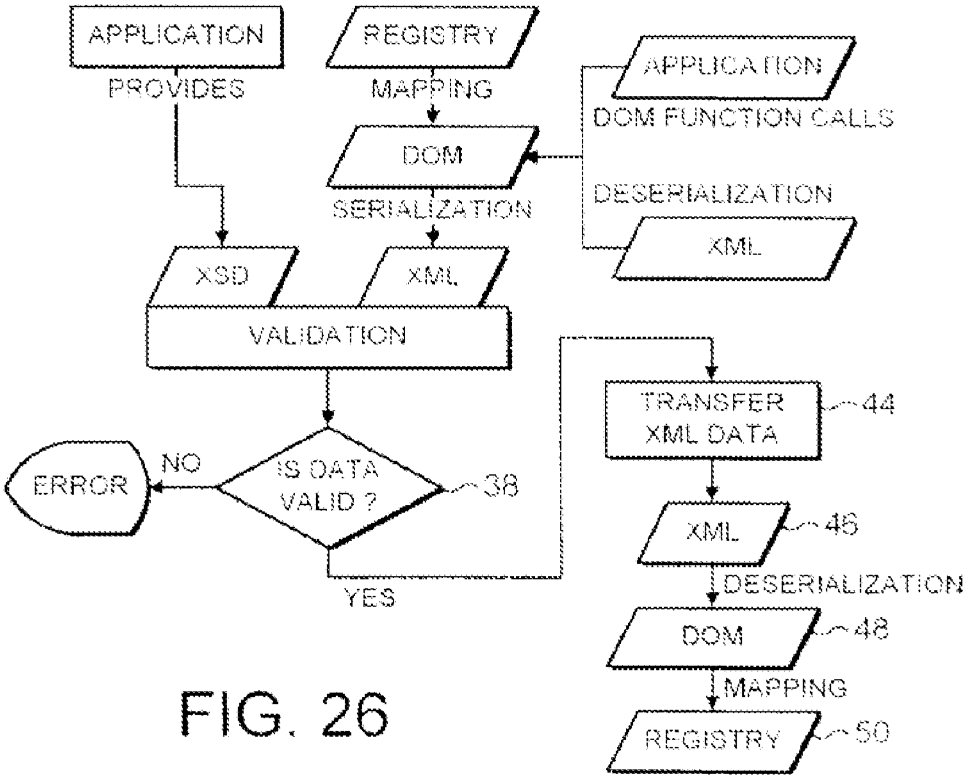
FIG. 26 schematically illustrates the technique of FIG. 25 followed by the transfer of the validated XML data to a managed computer and the application of that XML data to the managed computer.

FIG. 26 illustrates the process of FIG. 25 but in this case the successfully validated XML data is transmitted to another computer (a managed computer) at step 44. The received XML data 46 is de-serialised within the managed computer to form DOM data 48 which is then in turn mapped into Windows Registry data 50 for controlling the configuration of a different instance of the application program concerned that is installed within the managed computer. It will be appreciated that the editing and validation of the configuration data which occurred in the first portion of FIG. 26 is carried out by a configuration managing computer, such as a computer operated by a System Administrator, and once this edited program configuration has been successfully validated it is automatically distributed to associated managed computers and applied to those managed computers. In the example of FIG. 26, the managed computer does not itself recheck the validity of the configuration data which it receives. Instead it receives this data in the form of an XML data representation of its configuration which it maps into the required native configuration data and then applies this native configuration data.

Figure 27:
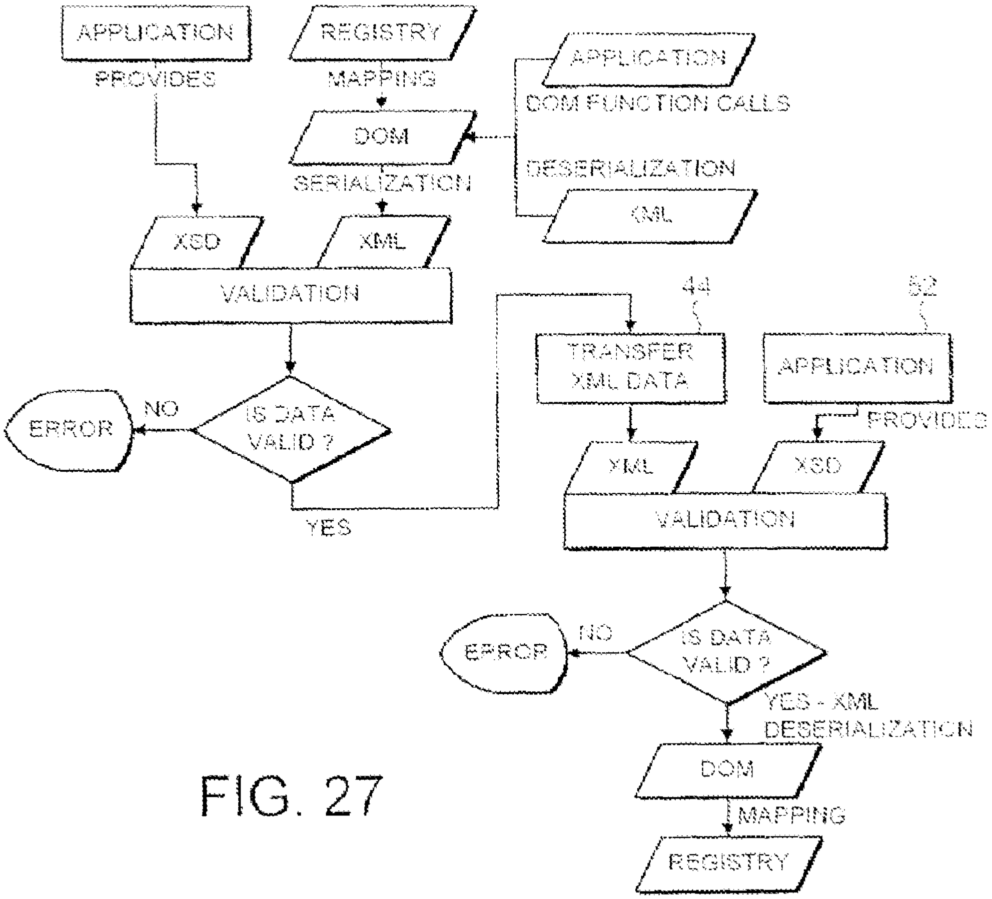
FIG. 27 illustrates a modification of the technique of FIG. 26 in which the managed computer also checks the received XML data again to validate it before it is applied.

FIG. 27 illustrates a modification of the technique of FIG. 26. After the XML data 44 representing the configuration has been transmitted (transferred) to the managed computer, the managed computer uses its own copy of the application program 52 concerned to read XSD data associated with the configuration data such that this may be validated by the managed computer itself before being applied. In this particular instance, the XML data representation of the configuration is validated both within the configuration managing computer and the managed computer. It would be possible, but probably less efficient, to only validate the data within the managed computer.

Figure 28:
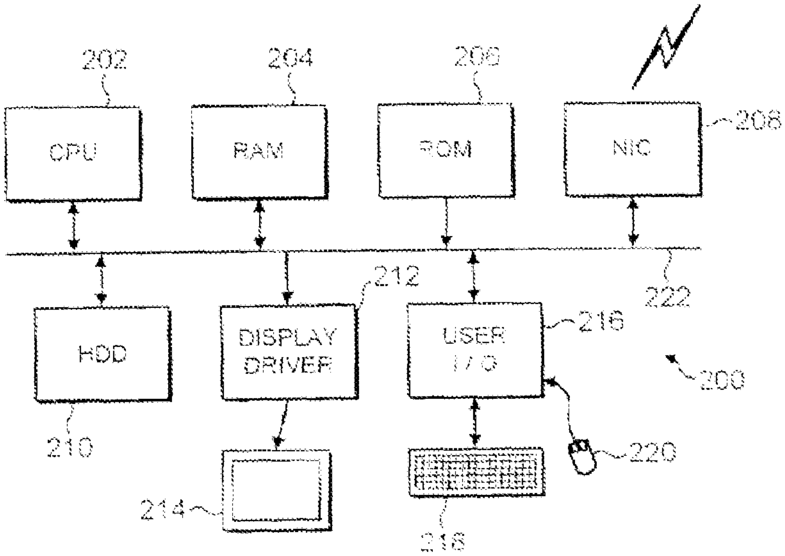
FIG. 28 is a schematic diagram representing a general purpose computer of the type that may be used to implement the above described techniques.

FIG. 28 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 28 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a tangible computer storage medium executed by a computer for triggering an operation at a destination computer using data transferred between a source computer and said destination computer, said computer program product comprising:

receiving code to receive at said destination computer operation specifying XML data sent by said source computer;

parsing code to parse said operation specifying XML data to identify one or more complex data types within said operation specifying XML data;

matching code to match each complex data type with an associated execution process available to said destination computer;

triggering code to trigger processing by each execution process associated with a complex data type within said operation specifying XML data; and validating code to validate said operation specifying XML data received at said destination computer against schema data, where said schema data is sent to said destination computer from said source computer at the same time as said operation specifying XML data;

wherein said operation performed includes configuring said destination computer to execute a computer program;

wherein said execution process maps configuration data specified within said operation specifying XML data to a configuration data store of said destination computer;

wherein said configuration data store is one of:

a Windows Registry entry;

an INI file;

a DAPI store; and a database entry;

wherein an identifier of said execution process within said complex data type includes at least one of:

data specifying a computer file to trigger said execution process;

data specifying a communication channel to trigger said execution process; and data specifying an operating system command to trigger said execution process;

wherein said operation includes returning result data from said destination computer to said source computer in dependence upon said operation performed by said execution process;

wherein said result data includes data specifying existing configuration data of said destination computer;

wherein said execution process maps existing configuration data of said destination computer stored within said configuration data store of said destination computer to said result data to be returned to said source computer;

wherein said operation specifying XML data is parsed after validating said operation specifying XML data to extract at least one identifier for mapping said at least one identifier to an available execution process;

wherein said operation specifying XML data includes parameter data used by said execution process in said operation.

2. A computer program product as claimed in claim 1, wherein parameter data used by said execution process is represented by data within said complex data type of said execution process.

3. A computer program product as claimed in claim 1, wherein said operation performed includes making a call to an API available to said destination computer.

4. A computer program product as claimed in claim 1, wherein said result data is passed from said destination computer to said source computer as XML data.

5. A computer program product as claimed in claim 1, wherein said operation includes returning result data from said destination computer to said source computer in dependence upon whether or not said execution process is available to said destination computer.

6. A computer program product as claimed in claim 1, wherein an operation that may be performed by said destination computer includes installing a new execution process.

7. A computer program product as claimed in claim 1, wherein said operation specifying data is validated by said destination computer by comparing with a template defining valid data.

8. A computer program product as claimed in claim 1, further comprising validating said operation specifying XML data received at said destination computer against said schema data, where said schema data is present in said destination computer when said operation specifying XML data is sent.

9. A computer program product as claimed in claim 1, wherein said validating of said operation specifying XML data and said schema data transmitted from said source computer to said destination computer at the same time generates a validation result.

10. A computer program product as claimed in claim 9, wherein said validation result triggers at least one of a valid configuration response and an invalid configuration response.

11. A computer program product as claimed in claim 10, wherein said invalid configuration response generates an error message.

12. A computer program product as claimed in claim 10, wherein said valid configuration response starts execution of an associated computer program.

13. A computer program product embodied on a tangible computer storage medium executed by a computer for triggering an operation at a destination computer using data transferred between a source computer and said destination computer, said computer program product comprising:

data forming code to form at said source computer operation specifying XML data containing one or more complex data types; and transmitting code to transmit from said source computer to said destination computer said operation specifying XML data;

wherein each complex data type within said operation specifying XML data corresponds to an execution process available to said destination computer to be triggered to operate;

wherein said operation performed includes configuring said destination computer to execute a computer program;

wherein said execution process maps configuration data specified within said operation specifying XML data to a configuration data store of said destination computer;

wherein said configuration data store is one of:

a Windows Registry entry;

an INI file;

a DAPI store; and a database entry;

wherein an identifier of said execution process within said complex data type includes at least one of:

data specifying a computer file to trigger said execution process;

data specifying a communication channel to trigger said execution process; and data specifying an operating system command to trigger said execution process;

wherein said operation includes returning result data from said destination computer to said source computer in dependence upon said operation performed by said execution process;

wherein said result data includes data specifying existing configuration data of said destination computer;

wherein said execution process maps existing configuration data of said destination computer stored within said configuration data store of said destination computer to said result data to be returned to said source computer;

wherein said operation specifying XML data is parsed after validating said operation specifying XML data to extract at least one identifier for mapping said at least one identifier to an available execution process;

wherein said operation specifying XML data includes parameter data used by said execution process in said operation;

wherein schema data is transmitted from said source computer to said destination computer at the same time as said operation specifying XML data.

14. A computer program product as claimed in claim 13, wherein parameter data used by said execution process is represented by data within said complex data type of said execution process.

15. A computer program product as claimed in claim 13, wherein said operation performed includes making a call to an API available to said destination computer.

16. A computer program product as claimed in claim 13, wherein said result data is passed from said destination computer to said source computer as XML data.

17. A computer program product as claimed in claim 13, wherein said operation includes returning result data from said destination computer to said source computer in dependence upon whether or not said execution process is available to said destination computer.

18. A computer program product as claimed in claim 13, wherein an operation that may be performed by said destination computer includes installing a new execution process.

19. A computer program product as claimed in claim 13, wherein said operation specifying data is validated by said destination computer by comparing with a template defining valid data.

20. A method of triggering an operation at a destination computer using data transferred between a source computer and said destination computer, said method comprising the steps of:

receiving at said destination computer operation specifying XML data sent by said source computer;

parsing said operation specifying XML data to identify one or more complex data types within said operation specifying XML data;

matching each complex data type with an associated execution process available to said destination computer;

triggering processing by each execution process associated with a complex data type within said operation specifying XML data; and validating said operation specifying XML data received at said destination computer against schema data, where said schema data is sent to said destination computer from said source computer at the same time as said operation specifying XML data;

wherein said operation performed includes configuring said destination computer to execute a computer program;

wherein said execution process maps configuration data specified within said operation specifying XML data to a configuration data store of said destination computer;

wherein said configuration data store is one of:

a Windows Registry entry;

an INI file;

a DAPI store; and a database entry;

wherein an identifier of said execution process within said complex data type includes at least one of:

data specifying a computer file to trigger said execution process;

data specifying a communication channel to trigger said execution process; and data specifying an operating system command to trigger said execution process;

wherein said operation includes returning result data from said destination computer to said source computer in dependence upon said operation performed by said execution process;

wherein said result data includes data specifying existing configuration data of said destination computer;

wherein said execution process maps existing configuration data of said destination computer stored within said configuration data store of said destination computer to said result data to be returned to said source computer;

wherein said operation specifying XML data is parsed after validating said operation specifying XML data to extract at least one identifier for mapping said at least one identifier to an available execution process;

wherein said operation specifying XML data includes parameter data used by said execution process in said operation.

21. A method as claimed in claim 20, wherein parameter data used by said execution process is represented by data within said complex data type of said execution process.

22. A method as claimed in claim 20 wherein said operation performed includes making a call to an API available to said destination computer.

23. A method as claimed in claim 20, wherein said result data is passed from said destination computer to said source computer as XML data.

24. A method as claimed in claim 20, wherein said operation includes returning result data from said destination computer to said source computer in dependence upon whether or not said execution process is available to said destination computer.

25. A method as claimed in claim 20, wherein an operation that may be performed by said destination computer includes installing a new execution process.

26. A method as claimed in claim 20, wherein said operation specifying data is validated by said destination computer by comparing with a template defining valid data.

27. A method of triggering an operation at a destination computer using data transferred between a source computer and said destination computer, said method comprising the steps of:

forming at said source computer operation specifying XML data containing one or more complex data types; and transmitting from said source computer to said destination computer said operation specifying XML data;

wherein each complex data type within said operation specifying XML data corresponds to an execution process available to said destination computer to be triggered to operate;

wherein said operation performed includes configuring said destination computer to execute a computer program;

wherein said execution process maps configuration data specified within said operation specifying XML data to a configuration data store of said destination computer;

wherein said configuration data store is one of:

a Windows Registry entry;

an INI file;

a DAPI store; and a database entry;

wherein an identifier of said execution process within said complex data type includes at least one of:

data specifying a computer file to trigger said execution process;

data specifying a communication channel to trigger said execution process; and data specifying an operating system command to trigger said execution process;

wherein said operation includes returning result data from said destination computer to said source computer in dependence upon said operation performed by said execution process;

wherein said result data includes data specifying existing configuration data of said destination computer;

wherein said execution process maps existing configuration data of said destination computer stored within said configuration data store of said destination computer to said result data to be returned to said source computer;

wherein said operation specifying XML data is parsed after validating said operation specifying XML data to extract at least one identifier for mapping said at least one identifier to an available execution process;

wherein said operation specifying XML data includes parameter data used by said execution process in said operation;

wherein schema data is transmitted from said source computer to said destination computer at the same time as said operation specifying XML data.

28. A method as claimed in claim 27, wherein parameter data used by said execution process is represented by data within said complex data type of said execution process.

29. A method as claimed in claim 27, wherein said operation performed includes making a call to an API available to said destination computer.

30. A method as claimed in claim 27, wherein said result data is passed from said destination computer to said source computer as XML data.

31. A method as claimed in claim 27, wherein said operation includes returning result data from said destination computer to said source computer in dependence upon whether or not said execution process is available to said destination computer.

32. A method as claimed in claim 27, wherein an operation that may be performed by said destination computer includes installing a new execution process.

33. A method as claimed in claim 27, wherein said operation specifying data is validated by said destination computer by comparing with a template defining valid data.

34. Apparatus for triggering an operation at a destination computer using data transferred between a source computer and said destination computer, said apparatus comprising:

receiving logic to receive at said destination computer operation specifying XML data sent by said source computer;

parsing logic to parse said operation specifying XML data to identify one or more complex data types within said operation specifying XML data;

matching logic to match each complex data type with an associated execution process available to said destination computer;

triggering logic to trigger processing by each execution process associated with a complex data type within said operation specifying XML data; and validating logic to validate said operation specifying XML data received at said destination computer against schema data, where said schema data is sent to said destination computer from said source computer at the same time as said operation specifying XML data;

wherein said operation performed includes configuring said destination computer to execute a computer program;

wherein said execution process maps configuration data specified within said operation specifying XML data to a configuration data store of said destination computer;

wherein said configuration data store is one of:

a Windows Registry entry;

an INI file;

a DAPI store; and a database entry;

wherein an identifier of said execution process within said complex data type includes at least one of:

data specifying a computer file to trigger said execution process;

data specifying a communication channel to trigger said execution process; and data specifying an operating system command to trigger said execution process;

wherein said operation includes returning result data from said destination computer to said source computer in dependence upon said operation performed by said execution process;

wherein said result data includes data specifying existing configuration data of said destination computer;

wherein said execution process maps existing configuration data of said destination computer stored within said configuration data store of said destination computer to said result data to be returned to said source computer;

wherein said operation specifying XML data is parsed after validating said operation specifying XML data to extract at least one identifier for mapping said at least one identifier to an available execution process;

wherein said operation specifying XML data includes parameter data used by said execution process in said operation.

35. Apparatus as claimed in claim 34, wherein parameter data used by said execution process is represented by data within said complex data type of said execution process.

36. Apparatus as claimed in claim 34, wherein said operation performed includes making a call to an API available to said destination computer.

37. Apparatus as claimed in claim 34, wherein said result data is passed from said destination computer to said source computer as XML data.

38. Apparatus as claimed in claim 34, wherein said operation includes returning result data from said destination computer to said source computer in dependence upon whether or not said execution process is available to said destination computer.

39. Apparatus as claimed in claim 34, wherein an operation that may be performed by said destination computer includes installing a new execution process.

40. Apparatus as claimed in claim 34, wherein said operation specifying data is validated by said destination computer by comparing with a template defining valid data.

41. Apparatus for triggering an operation at a destination computer using data transferred between a source computer and said destination computer, said apparatus comprising:

data forming logic to form at said source computer operation specifying XML data containing one or more complex data types;

transmitting logic to transmit from said source computer to said destination computer said operation specifying XML data;

wherein each complex data type within said operation specifying XML data corresponds to an execution process available to said destination computer to be triggered to operate;

wherein said operation performed includes configuring said destination computer to execute a computer program;

wherein said execution process maps configuration data specified within said operation specifying XML data to a configuration data store of said destination computer;

wherein said configuration data store is one of:

a Windows Registry entry;

an INI file;

a DAPI store; and a database entry;

wherein an identifier of said execution process within said complex data type includes at least one of:

data specifying a computer file to trigger said execution process;

data specifying a communication channel to trigger said execution process; and data specifying an operating system command to trigger said execution process;

wherein said operation includes returning result data from said destination computer to said source computer in dependence upon said operation performed by said execution process;

wherein said result data includes data specifying existing configuration data of said destination computer;

wherein said execution process maps existing configuration data of said destination computer stored within said configuration data store of said destination computer to said result data to be returned to said source computer;

wherein said operation specifying XML data is parsed after validating said operation specifying XML data to extract at least one identifier for mapping said at least one identifier to an available execution process;

wherein said operation specifying XML data includes parameter data used by said execution process in said operation;

wherein schema data is transmitted from said source computer to said destination computer at the same time as said operation specifying XML data.

42. Apparatus as claimed in claim 41, wherein parameter data used by said execution process is represented by data within said complex data type of said execution process.

43. Apparatus as claimed in claim 41, wherein said operation performed includes making a call to an API available to said destination computer.

44. Apparatus as claimed in claim 41, wherein said result data is passed from said destination computer to said source computer as XML data.

45. Apparatus as claimed in claim 41, wherein said operation includes returning result data from said destination computer to said source computer in dependence upon whether or not said execution process is available to said destination computer.

46. Apparatus as claimed in claim 41, wherein an operation that may be performed by said destination computer includes installing a new execution process.

47. Apparatus as claimed in claim 41, wherein said operation specifying data is validated by said destination computer by comparing with a template defining valid data.

* * * * *